United States Patent
Gu et al.

(10) Patent No.: US 11,281,769 B2
(45) Date of Patent: Mar. 22, 2022

(54) SOFTWARE INTEGRITY VERIFICATION

(71) Applicant: Irdeto B.V., Hoofddorp (NL)

(72) Inventors: Yuan Xiang Gu, Ottawa (CA); Harold Johnson, Ottawa (CA)

(73) Assignee: IRDETO B.V., Hoofddorp (NL)

( * ) Notice: Subject to any disclaimer, the term of this patent is extended or adjusted under 35 U.S.C. 154(b) by 287 days.

(21) Appl. No.: 16/466,306

(22) PCT Filed: Dec. 15, 2016

(86) PCT No.: PCT/EP2016/081164
§ 371 (c)(1),
(2) Date: Jun. 4, 2019

(87) PCT Pub. No.: WO2018/108275
PCT Pub. Date: Jun. 21, 2018

(65) Prior Publication Data
US 2020/0065480 A1    Feb. 27, 2020

(51) Int. Cl.
*G06F 21/00* (2013.01)
*G06F 21/54* (2013.01)
*G06F 21/64* (2013.01)

(52) U.S. Cl.
CPC ............. *G06F 21/54* (2013.01); *G06F 21/64* (2013.01); *G06F 2221/033* (2013.01)

(58) Field of Classification Search
CPC ..... G06F 2221/033; G06F 21/64; G06F 21/54
(Continued)

(56) References Cited

U.S. PATENT DOCUMENTS 6,594,761 B1    7/2003    Chow et al.
6,779,114 B1    8/2004    Chow et al.
(Continued)

FOREIGN PATENT DOCUMENTS

EP    2378452 B1    10/2011
WO    2009140774 A1    11/2009
(Continued)

OTHER PUBLICATIONS

Canadian Intellectual Property Office, Office Action for Canadian Application No. 3047009 dated Jul. 10, 2020.
(Continued)

*Primary Examiner* — Josnel Jeudy
(74) *Attorney, Agent, or Firm* — Rimon PC; Marc Kaufman

(57) ABSTRACT

A method comprising, during runtime of an item of software that comprises one or more portions of code and verification code: the verification code generating verification data using (a) runtime data generated by the one or more portions of code and (b) one or more predetermined parameters, the verification data representing an element of a predetermined first set of data elements; and providing the verification data to an integrity checker arranged to (i) identify that a modification relating to the verification code has not occurred if the verification data represents an element of a predetermined second set of data elements, wherein the second set is a subset of the first set, and (ii) identify that a modification relating to the verification code has occurred if the verification data does not represent an element of the second set; wherein it is computationally infeasible to determine an element of the second set without knowledge of the one or more predetermined parameters or data related to the one or more predetermined parameters; and wherein, in the absence of a modification relating to the verification code, use of the one or more predetermined parameters by the verification code ensures that the verification data represents an element of the second set and use of the runtime data by the verification code controls which element of the second set is represented by the generated verification data.

38 Claims, 9 Drawing Sheets

(58) Field of Classification Search
USPC .......................................................... 726/23
See application file for complete search history.

(56) References Cited

U.S. PATENT DOCUMENTS

| | | | |
|---|---|---|---|
| 6,842,862 B2 | 1/2005 | Chow et al. | |
| 7,155,745 B1* | 12/2006 | Shin | G06F 9/547 |
| | | | 726/27 |
| 7,350,085 B2 | 3/2008 | Johnson et al. | |
| 7,395,433 B2 | 7/2008 | Chow et al. | |
| 7,397,916 B2 | 7/2008 | Johnson et al. | |
| 7,966,499 B2 | 6/2011 | Kandanchatha et al. | |
| 9,177,153 B1 | 11/2015 | Perrig et al. | |
| 2008/0313120 A1* | 12/2008 | Kumbi | G06F 21/64 |
| | | | 706/47 |
| 2012/0254830 A1* | 10/2012 | Conrad | G06F 8/35 |
| | | | 717/106 |
| 2012/0304296 A1* | 11/2012 | Shulman | H04L 63/1433 |
| | | | 726/23 |
| 2016/0099811 A1* | 4/2016 | Hawblitzel | H04L 9/0825 |
| | | | 713/176 |
| 2016/0226710 A1* | 8/2016 | Cha | H04L 41/0654 |
| 2016/0239647 A1 | 8/2016 | Johnson et al. | |
| 2017/0109525 A1 | 4/2017 | Sistany | |

FOREIGN PATENT DOCUMENTS

| | | | |
|---|---|---|---|
| WO | 2011120123 | A1 | 10/2011 |
| WO | 2012126077 | A1 | 9/2012 |
| WO | 2013142979 | A1 | 10/2013 |
| WO | 2013142980 | A1 | 10/2013 |
| WO | 2013142981 | A1 | 10/2013 |
| WO | 2013142983 | A1 | 10/2013 |
| WO | 2015149828 | A1 | 10/2015 |
| WO | 2015150376 | A1 | 10/2015 |
| WO | 2015150391 | A9 | 10/2015 |

OTHER PUBLICATIONS

Wurster, G., et al., "A generic attack on checksumming-based software tamper resistance," Proceedings of the 2005 IEEE Symposium on Security and Privacy, May 8, 2005, Oakland, California, pp. 1-12.

Chow, S., et al., "A White-Box DES Implementation for DRM Applications," in: Feigenbaum J. (eds) Digital Rights Management. DRM 2002. Lecture Notes in Computer Science, vol. 2696. Springer, Berlin, Heidelberg; Jan. 1, 2003, pp. 1-15. https://doi.org/10.1007/978-3-540-44993-5_1.

Wikipedia, entry for "Checksum," last revised Nov. 24, 2016; available at: https://en.wikipedia.org/w/index.php?title=Checksum&oldid=751319242.

Wikipedia, entry for "Cryptographic hash function," last revised Dec. 12, 2016; available at: https://en.wikipedia.org/w/index.php?title=Cryptographic_hash_function&oldid=754315943.

Wikipedia, entry for "File verification," last revised on Nov. 19, 2016; available at: https://en.wikipedia.org/w/index.php?title=File_verification&oldid=750471025.

Wikipedia, entry for "Malware," last revised on Dec. 12, 2016; available at: https://en.wikipedia.org/w/index.php?title=Malware&oldid=754485808.

Chow, S., et al., "White-Box Cryptography and an AES Implementation," In: Nyberg K., Heys H. (eds) Selected Areas in Cryptography. SAC 2002. Lecture Notes in Computer Science, vol. 2595. Springer, Berlin, Heidelberg; Feb. 17, 2003, pp. 1-21. https://doi.org/10.1007/3-540-36492-7_17.

International Search Report and Written Opinion for International Application No. PCT/EP2016/081164, dated Jun. 2, 2017.

Collberg, C., et al., "Surreptitious Software—Obfuscation, Watermarking, and Tamperproofing for Software Protection", Aug. 1, 2009, Addison-Wesley. ISBN:0321549252 9780321549259.

European Patent Office, Office Action for European Application No. 16812743.9 dated Jan. 28, 2021.

\* cited by examiner

SOFTWARE INTEGRITY VERIFICATION

FIELD OF THE INVENTION

The present invention relates to a method of protecting an item of software, a method of executing such a protected item of software and a method of verifying such a protected item of software, as well as corresponding apparatus and computer programs.

BACKGROUND OF THE INVENTION

Software applications often operate or execute in a hostile environment. This hostile environment can be formalized as a white box attack scenario—in this scenario, attackers are assumed to have the ability to inspect and modify the code/instructions and data/resources of, and the runtime data generated by, the software application, both prior to and during execution of the software application.

An important protection goal is to ascertain the operational correctness of a software application. This is often referred to as integrity verification (see, for example, https://en.wikipedia.org/wiki/File_verification, the entire disclosure of which is incorporated herein by reference). IV aims to ensure that the software application executed at runtime is the version released by the supplier of the software application. This helps the end-user or a service provider to trust that an original/authentic copy of the software application is executing instead of a modified version (e.g. a version containing malware).

The traditional approach to IV is to compute a value based on some or all of the original code of the software application, when this code is read as data—this value could, for example, be calculated as a checksum or hash or a cryptographically strong hash of the code that has been read. Use of a cryptographically strong hash makes it infeasible for the attacker to modify the code whilst maintaining the original hash-value—hence, a modification to the code can be identified by detecting an incorrect or unexpected hash-value. Such IV can be carried out by an IV module that has been incorporated, say, into the software application or that is executing as a separate process. This is illustrated schematically in FIG. 10 of the accompanying drawings.

However, this approach to IV can be defeated if an attacker is able to modify the IV module in a way that skips or disables the verification step or changes the IV test to always report success. Thus, IV modules are often implemented in a secured manner, with one or more software protection techniques applied thereto, such as known white-box protection techniques that help thwart reverse engineering attacks. Thus, such a secured software application is difficult to reverse engineer, which provides some level of assurance that the software application will provide its intended functionality. The secured software application also may comprise a normal IV method to increase trust in the software application.

However, the WVS (Wurster, van Oorschot, Somayaji) attack (see G. Wurster, P.C. van Oorschot, A. Somayaji, "A generic attack on check-summing-based software tamper-resistance", Technical Report TR-04-09, Carleton University, November, 2004) shows that it is possible to attack such traditional IV protection. The WVS attack is based on the observation that computer hardware often distinguishes code-fetches from data-fetches. This distinction improves processor Pipelining, caching and/or memory protection. The attack involves a 'shim' installed at a low level in the hardware. This shim induces a mismatch between the value retrieved using a data-fetch and one retrieved using a code-fetch. In particular, an attacker can cause "correct/unmodified" code to be fetched in response to a data-fetch (so that a hash or checksum calculated using data-fetches to read the code remains the same "correct" value), whilst code fetched in response to a code-fetch can be modified/attacked code. Similarly, in a virtual machine as with Java, JavaScript, Perl, Python, Ruby, and the like, it is possible for an attacker to modify the software implementing the virtual machine and implement a virtual shim. The virtual shim causes data accesses to the executing code to see unchanged code, while code-fetches used during execution see code which the attacker has changed. Thus the code appears to the IV module to be unchanged even after tampering: the IV defense has been nullified.

Other approaches to IV are disclosed, for example, in WO2015/149828 (the entire disclosure of which is incorporated herein by reference). With this approach, a secured software application comprises assertion tests that verify whether a predetermined invariant condition holds. These checks on invariant conditions increase the integrity of the software application as attacker modifications are likely to cause an invariant property to fail.

SUMMARY OF THE INVENTION

As discussed above, some traditional integrity verification techniques are vulnerable to attacks that leverage code read access to hide code modifications. Other code integrity preserving methods refrain from code reads and only verify the data processed by the application, but rely on certain invariant conditions present in the code.

It would be desirable to provide an improved method for carrying out integrity verification.

Embodiments of the invention do not rely on existing invariant conditions in the code, nor do they rely on calculations (such as hashes) on code that has been read from memory. Embodiments of the invention may blend data integrity verification code with normal/original code of an item of software in a way that makes it very hard for an attacker to differentiate between the two types of code. Such blending may combine normal data and additional data as input to a runtime data integrity verification algorithm. The runtime data integrity verification algorithm may use operations that are very similar to normal software operations and that can be easily broken up in small code fragments for code blending operations. When an attacker modifies such secured blended code and/or data of or generated by a software application protected using certain embodiments of the invention, there is a high probability that such a modification also will change the computational behaviour of the code, or the data resulting from, the runtime data integrity verification method. As the data integrity method is preferably designed to produce a failure result even with a minor change to the code and/or data, it is very hard to make undetected modifications. Hence, such blending of these new behaviours of runtime data integrity verification with original application behaviours helps preserve the integrity of the secured software application.

According to a first aspect of the invention, there is provided a method comprising, during runtime of an item of software that comprises one or more portions of code and verification code: the verification code generating verification data using (a) runtime data generated by the one or more portions of code and (b) one or more predetermined parameters, the verification data representing an element of a predetermined first set of data elements; and providing the verification data to an integrity checker arranged to (i) identify that a modification relating to the verification code has not occurred if the verification data represents an element of a predetermined second set of data elements, wherein the second set is a subset of the first set, and (ii) identify that a modification relating to the verification code has occurred if the verification data does not represent an element of the second set; wherein it is computationally infeasible to determine an element of the second set without knowledge of the one or more predetermined parameters or data related to the one or more predetermined parameters; and wherein, in the absence of a modification relating to the verification code, use of the one or more predetermined parameters by the verification code ensures that the verification data represents an element of the second set and use of the runtime data by the verification code controls which element of the second set is represented by the generated verification data.

According to a second aspect of the invention, there is provided a method of protecting an item of software, wherein the item of software comprises one or more portions of code, the method comprising: modifying the item of software so that the item of software comprises verification code that is arranged to, during runtime of the item of software: generate verification data using (a) runtime data generated by the one or more portions of code and (b) one or more predetermined parameters, the verification data representing an element of a predetermined first set of data elements; and provide the verification data to an integrity checker arranged to (i) identify that a modification relating to the verification code has not occurred if the verification data represents an element of a predetermined second set of data elements, wherein the second set is a subset of the first set, and (ii) identify that a modification relating to the verification code has occurred if the verification data does not represent an element of the second set; wherein it is computationally infeasible to determine an element of the second set without knowledge of the one or more predetermined parameters or data related to the one or more predetermined parameters; and wherein, in the absence of a modification relating to the verification code, use of the one or more predetermined parameters by the verification code ensures that the verification data represents an element of the second set and use of the runtime data by the verification code controls which element of the second set is represented by the generated verification data.

In some embodiments, each of the one or more predetermined parameters is part of the verification code or is part of data included into the item of software during said modifying.

In some embodiments, the verification code does not generate the verification data based on software elements present in the item of software prior to said modifying.

According to a third aspect of the invention, there is provided a method of verifying an item of software, the item of software comprising verification code for generating verification data, the method comprising: receiving verification data, the verification data representing an element of a predetermined first set of data elements; if the verification data represents an element of a predetermined second set of data elements, wherein the second set is a subset of the first set, identifying that a modification relating to the verification code has not occurred; and if the verification data does not represent an element of the second set, identifying that a modification relating to the verification code has occurred; and wherein it is computationally infeasible to determine an element of the second set without knowledge of one or more predetermined parameters or data related to the one or more predetermined parameters; wherein, in the absence of a modification relating to the verification code, use of the one or more predetermined parameters by the verification code ensures that the verification data represents an element of the second set and use of runtime data generated by one or more portions of code of the item of software by the verification code controls which element of the second set is represented by the generated verification data.

In some embodiments, the method comprises: identifying whether the received verification data corresponds to verification data previously received in relation to the item of software; if the received verification data does not correspond to verification data previously received in relation to the item of software, identifying that a modification relating to the verification code has not occurred; and if the received verification data corresponds to verification data previously received in relation to the item of software, identifying that a modification relating to the verification code has occurred.

In some embodiments of any of the first to third aspects, the verification code generates the verification data by using the runtime data to generate pseudo-random data and generating the verification data using the pseudo-random data and the one or more predetermined parameters.

In some embodiments of any of the first to third aspects, the runtime data is pseudo-random or a source of entropy.

In some embodiments of any of the first to third aspects, the verification code is arranged to generate verification data that differs from substantially all verification data previously generated by the verification code.

In some embodiments of any of the first to third aspects, the verification code is arranged to generate verification data that differs from substantially all verification data previously generated by the verification code due to the runtime data used to generate the verification data differing from substantially all runtime data previously used by the verification code to generate verification data.

In some embodiments of the first aspects, the method comprises encrypting or transforming the verification data, wherein providing the verification data to the integrity checker comprises provided the encrypted or transformed verification data to the integrity checker.

In some embodiments of any of the first to third aspects:
the one or more predetermined parameters comprises:
(i) a key;
(ii) a predetermined bit sequence having m bits;
(iii) for each bit of the predetermined bit sequence, a respective location within
an n-bit value, where m and n are positive integers with m less than n;
the first set of data elements comprises all possible n-bit values; and
the second set of data elements comprises all possible n-bit values that are an encrypted version, using the key, of an n-bit value B* that comprises the m bits of the predetermined bit sequence at their respective locations within said n-bit value B*.

In some embodiments of any of the first to third aspects:
the one or more predetermined parameters comprises:
(i) a predetermined bit sequence having m bits;
(ii) for each bit of the predetermined bit sequence, a respective location within
an n-bit value, where m and n are positive integers with m less than n;
the first set of data elements comprises all possible n-bit values; and the second set of data elements comprises all possible n-bit values that comprise the m bits of the predetermined bit sequence at their respective locations within the n-bit value.

In some embodiments of any of the first to third aspects:

the one or more predetermined parameters comprises k vectors $q_i (i=1, \ldots, k)$ wherein:

k is a positive integer greater than 1;

for each vector $q_i (i=1, \ldots, k)$, the vector $q_i$ is a vector of length L of elements of a ring R;

there is a predetermined L×L matrix M of elements R and, a predetermined vector s of length L of elements of R so that, for each vector $q_i (i=1, \ldots, k)$, $Mq_i = s$;

the first set of data elements comprises all possible vectors of length L of elements of R; and the second set of data elements comprises all possible vectors x of length L of elements of R for which $Mx=s$.

The verification code may generate verification data v according to $v=\Sigma_{i=1}^{k} a_i q_i$, wherein $a_i (i=1, \ldots, k)$ are elements of R determined based on the runtime data and $\Sigma_{i=1}^{k} a_i = 1$.

The one or more predetermined parameters may additionally comprise j vectors $z_i (i=1, \ldots, j)$ wherein:

j is a positive integer;

for each vector $z_i (i=1, \ldots, j)$, the vector $z_i$ is a vector of length L of elements of R and $Mz_i = 0$.

The verification code may generate verification data v according to $v=\Sigma_{i=1}^{k} a_i q_i + \Sigma_{i=1}^{j} b_i z_i$, wherein $a_i (i=1, \ldots, k)$ are elements of R determined based on the runtime data, $\Sigma_{i=1}^{k} a_i = 1$, and $b_i (i=1, \ldots, j)$ are elements of R determined based on the runtime data.

L may b equal to m+n, where m and n are positive integers; M may then be based on the matrix $$B = \begin{bmatrix} A & 0_{m \times n} \\ 0_{n \times m} & 0_{n \times n} \end{bmatrix},$$

where A is an invertible m×m matrix of elements in R and where $0_{a \times b}$ represents an a×b matrix with all of its elements equal to 0; and s may be based on a vector comprising an m×1 vector c of elements in R and n 0's. In such embodiments, one of the following may apply:

(i) M=B; s is the vector c with the n 0's appended thereto; and for each vector $q_i (i=1, \ldots, k)$, the vector $q_i$ is a vector comprising a vector u and n elements of R appended thereto, where $u=A^{-1}c$;

(ii) M=XB, where X is an invertible L×L matrix of elements in R; s is the vector XC, where C is the vector c with the n 0's appended thereto; and for each vector $q_i (i=1, \ldots, k)$, the vector $q_i$ is a vector comprising a vector u and n elements of R appended thereto, where $u=A^{-1}c$;

(iii) M=BY, where Y is an invertible L×L matrix of elements in R; s is the vector c with the n 0's appended thereto; and for each vector $q_i (i=1, \ldots, k)$, the vector $q_i$ is a vector comprising the vector $Y^{-1}U$, where U is a vector u with n elements of R appended thereto, where $u=A^{-1}c$;

(iv) M=XBY, where X and Y are an invertible L×L matrices of elements in R; s is the vector XC, where C is the vector c with the n 0's appended thereto; and for each vector $q_i (i=1, \ldots, k)$, the vector $q_i$ is a vector comprising the vector $Y^{-1}U$, where U is a vector u with n elements of R appended thereto, where $u=A^{-1}c$.

In some embodiments of any of the first to third aspects, the verification code is interleaved with other code of the item of software.

In some embodiments of any of the first to third aspects, one or more white-box protection techniques are applied to at least the verification code to thereby protect the verification code.

According to a fourth aspect of the invention, there is provided an apparatus arranged to carry out a method according to any one of the above-mentioned methods.

According to a fifth aspect of the invention, there is provided a computer program which, when executed by one or more processors, causes the one or more processors to carry out a method according to any one of the above-mentioned methods. The computer program may be stored on a computer-readable medium.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System Overview

Figure 1:
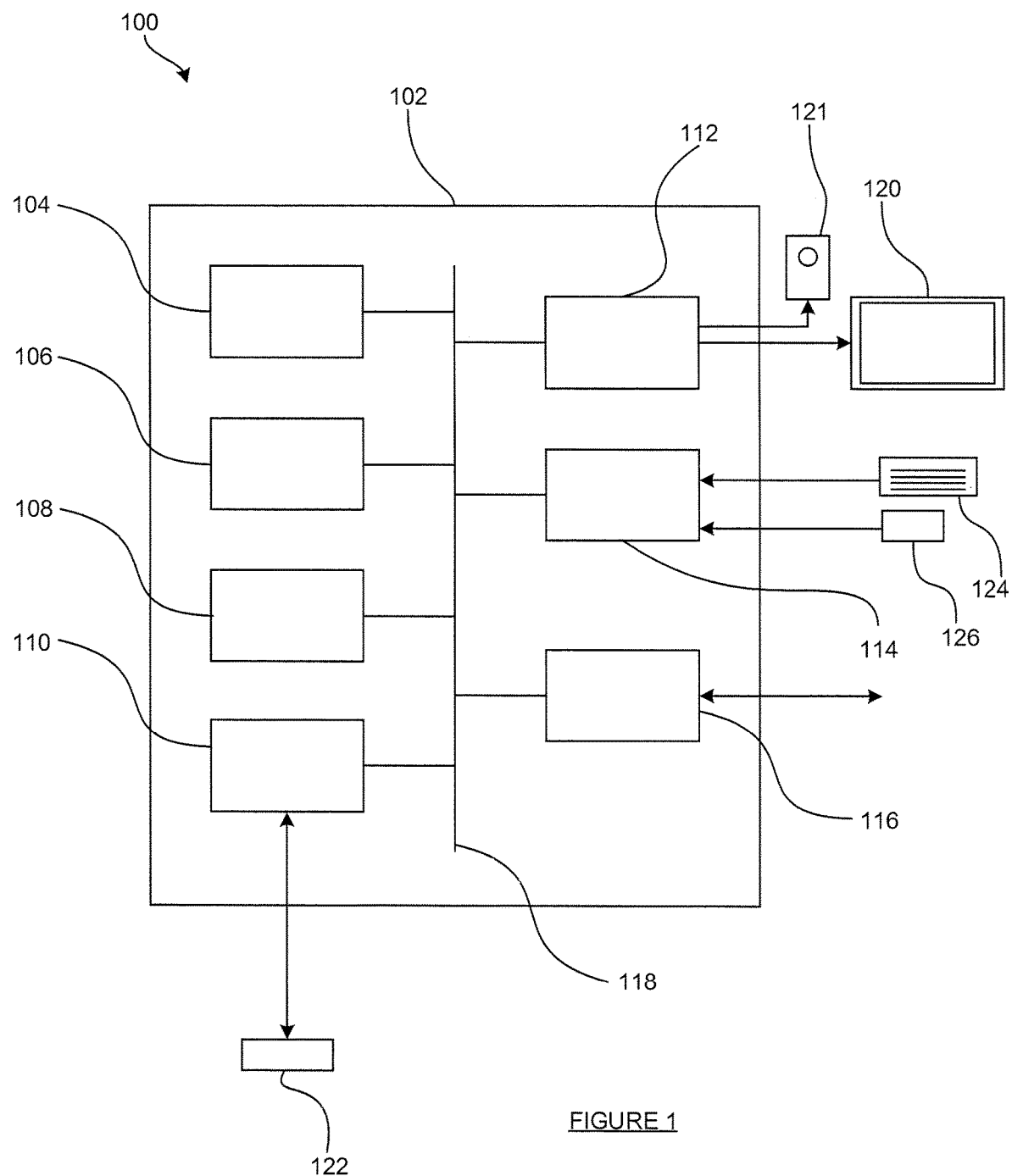
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which may be linked together over one or more communication buses 118.

The storage medium 104 may be any form of non-volatile data storage device such as one or more of a hard disk drive, a magnetic disc, an optical disc, a solid-state-storage device, a ROM, etc. The storage medium 104 may store an operating system for the processor 108 to execute in order for the computer 102 to function. The storage medium 104 may also store one or more computer programs (or software).

The memory 106 may be any random access memory (storage unit or volatile storage medium) suitable for storing data and/or computer programs (or software).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc.

2—System architecture and use

Figure 2A:
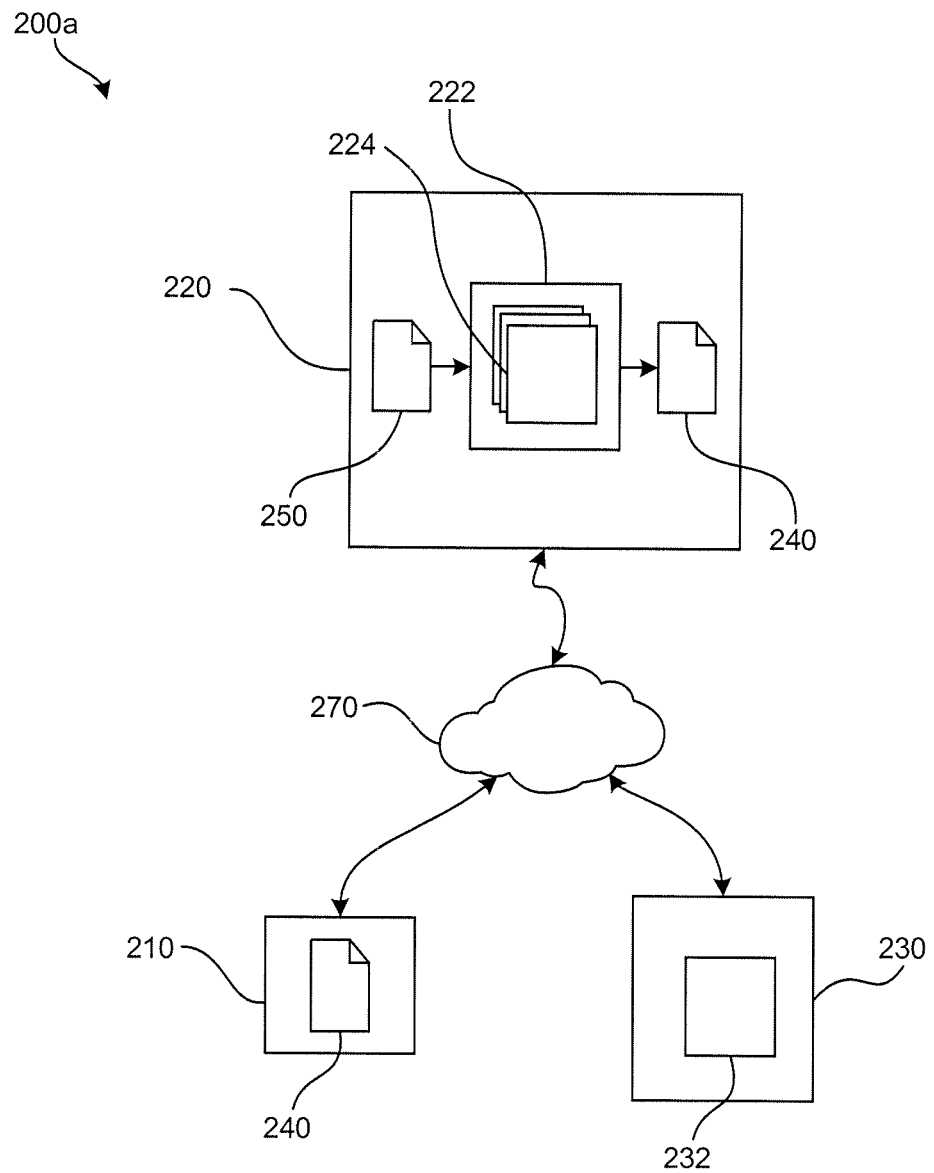
FIGS. 2a and 2b schematically illustrate example systems according to some embodiments of the invention.

FIG. 2a schematically illustrates an example system 200a according to some embodiments of the invention. The system 200a comprises a computer system (or client system or user system) 210, a protection system 220, a verification system 230 and a network 270.

In summary, the computer system 210 is arranged to execute or process an item of software 240. The item of software 240 is a protected item of software —the nature of the "protection" that has been applied to the item of software 240 (or which the item of software 240 incorporates or uses) shall be described in more detail later. The protection system 220 is responsible for generating the protected item of software 240 based on an initial item of software 250. The verification system 230 is used, during execution of the protected item of software 240, to check or verify the integrity of the protected item of software 240 (or at least to check or verify the integrity of some or all of the protected item of software 240)—the nature of such integrity verification shall be described in more detail later. As shall become apparent, the system 200a enables protection of an initial item of software 250, so that the resulting protected item of software 240 may be executed on a computer system 210, with the verification system 230 checking integrity of some or all of the protected item of software 240 during execution of the protected item of software 240 on the computer system 210.

The computer system 210, the protection system 220 and the verification system 230 may be arranged to communicate with each other over, or via, the network 270. The network 270 may be any kind of network suitable for transmitting or communicating data from any one of the computer system 210, the protection system 220 and the verification system 230 to another one of the computer system 210, the protection system 220 and the verification system 230. For example, the network 270 could comprise one or more of: a local area network, a wide area network, a metropolitan area network, the internet, a wireless communications network, a cable network, a digital broadcast network, a satellite communication network, a telephone network, etc. The computer system 210, the protection system 220 and the verification system 230 may communicate over the network 270 via any suitable communication mechanism/protocol in order to communicate data with each other. However, it will be appreciated that other communication scenarios are possible.

Whilst FIG. 2a illustrates a single computer system 210, a single protection system 220 and a single verification system 230, it will be appreciated that there may be multiple computer systems 210 and/or multiple protection systems 220 and/or multiple verification systems 230 and that FIG. 2a has been simplified for ease of illustration.

The computer system 210, the protection system 220 and the verification system 230 may each be, or may each comprise, one or more computer systems 100 as described above with reference to FIG. 1. For example, the computer system 210 may be a personal computer, a server computer, a laptop, a mobile telephone, a tablet computer, a television, etc. Similarly, the protection system 220 and the verification system 230 may, for example, each comprise one or more server computers.

The protection system 220 and the verification system 230 may be operated by separate entities, or may be operated by the same entity. The protection system 220 and the verification system 230 may be physically separate from each other, or they may share one or more computer systems 100 (e.g. they may be implemented, at least in part, using one or more common servers).

An operator of the computer system 210 may be an attacker, in that the operator may wish to launch an attack against (or based on or using) an item of software executed on the computer system 210. For example: (a) the item of software may contain, or generate, secret information that the attacker wishes to obtain (such as one or more cryptographic keys, one or more secret keys, data of other users, etc.) via the attack; (b) the attacker may try to use the item of software (in a manner not initially intended or authorized by the creator of the item of software) to achieve functionality to which the attacker is not entitled or authorized, such as by circumventing or thwarting security checks; (c) the attacker may wish to achieve new/alternative functionality not originally intended with the item of software; (d) the attacker may wish to use the item of software to try to gain unauthorized access to functionality or data from one or more servers (e.g. a server hosting a website associated with a webpage providing or comprising the item of software); etc.

A so-called "white-box" attack environment is an attack model for the execution of an item of software, in which the model identifies that an attacker has various capabilities as described in more detail below (i.e. the attacker can carry out certain actions/operations and has access to certain data). Therefore, if an attacker would have those capabilities when the item of software is actually being executed in a particular execution environment (e.g. using a particular computer/processor etc.) then one may say that the item of software is executing in a "white-box" environment. In the white-box attack environment, the attacker of the item of software is assumed to have full access to, and visibility of, the data being operated on (including intermediate values), memory contents and execution/process/control flow of the item of software. Moreover, in the white-box attack environment, the attacker is assumed to be able to modify the data being operated on, the memory contents and the execution/process/control flow of the item of software, for example by using a debugger—in this way, the attacker can experiment on, and try to manipulate the operation of, the item of software, with the aim of circumventing initially intended functionality and/or identifying secret information and/or for other purposes.

However, the item of software may need to use or store or generate secret information (e.g. one or more cryptographic keys or identifiers), where this information needs to remain hidden from, or unusable/inaccessible by, the attacker (except as part of the correct/intended functionality of the item of software); the item of software may need to execute different portions of code based on particular decision logic, where it is important to ensure that an attacker cannot force the software to execute one portion of code instead of another portion of code in contradiction to the decision logic; etc. The set-up, configuration and capabilities of the computer system 210 are not necessarily known (or fully known) to, and/or are not controllable (or fully controllable) by, the provider of the item of software, and so it can be assumed that the item of software may end up being executed in a white-box attack environment. This is particularly relevant when the item of software is written in a scripted or interpreted language, such as JavaScript, due to the human-readable nature of scripted or interpreted languages (as opposed to, say, compiled binary executable files)—the user of the computer system 210 can view, monitor and modify execution of such items of software (e.g. during interpretation or after just-in-time compilation), which makes it easy for an attacker to copy and modify the item of software and/or its data or control flow in an attempt to launch an attack against/using the item of software. This is why, instead of executing the initial item of software 250 on the computer system 210, the initial item of software 250 has one or more software protection techniques applied to it by the protection system 220, resulting in the protected item of software 240. It is this protected item of software 240 which is executed on the computer system 210. The protection techniques applied in order to generate the protected item of software 240 aim to make it difficult for an attacker to carry out a successful attack on the protected item of software 240, and/or aim to reduce/mitigate the consequences of such an attack by an attacker—i.e. the protection techniques aim to secure the initial item of software 250 against the white-box attack environment.

The protection system 220 comprises, or is arranged to execute, a protection application 222. In summary, the protection application 222 receives the initial item of software 250 and applies one or more "protections" to the item of software 250 to thereby generate and output the protected item of software 240. Thus, the protection application 222 comprises one or more protector modules or components 224 that is/are arranged to apply one or more "protections" to the initial item of software 250, or to a version of the item of software 250 that has already had one or more of these protections applied by one or more of the protector modules 224 (as shall be described in more detail later).

The verification system 230 comprises, or is arranged to execute, an integrity checking application 232. Thus, the verification system 230 may be viewed as an integrity checking system 230. In summary, during execution or runtime of the protected item of software 240, the protected item of software 240 generates and provides (or communicates or transmits) verification data (or an integrity value/data, or a verification result) to the integrity checking application 232 via the network 270. The integrity checking application 232 receives the verification data and performs integrity verification functionality based on the received verification data (as shall be described in more detail later). The integrity verification functionality may be viewed as "checking the 'correctness' of the verification data".

Figure 2B:
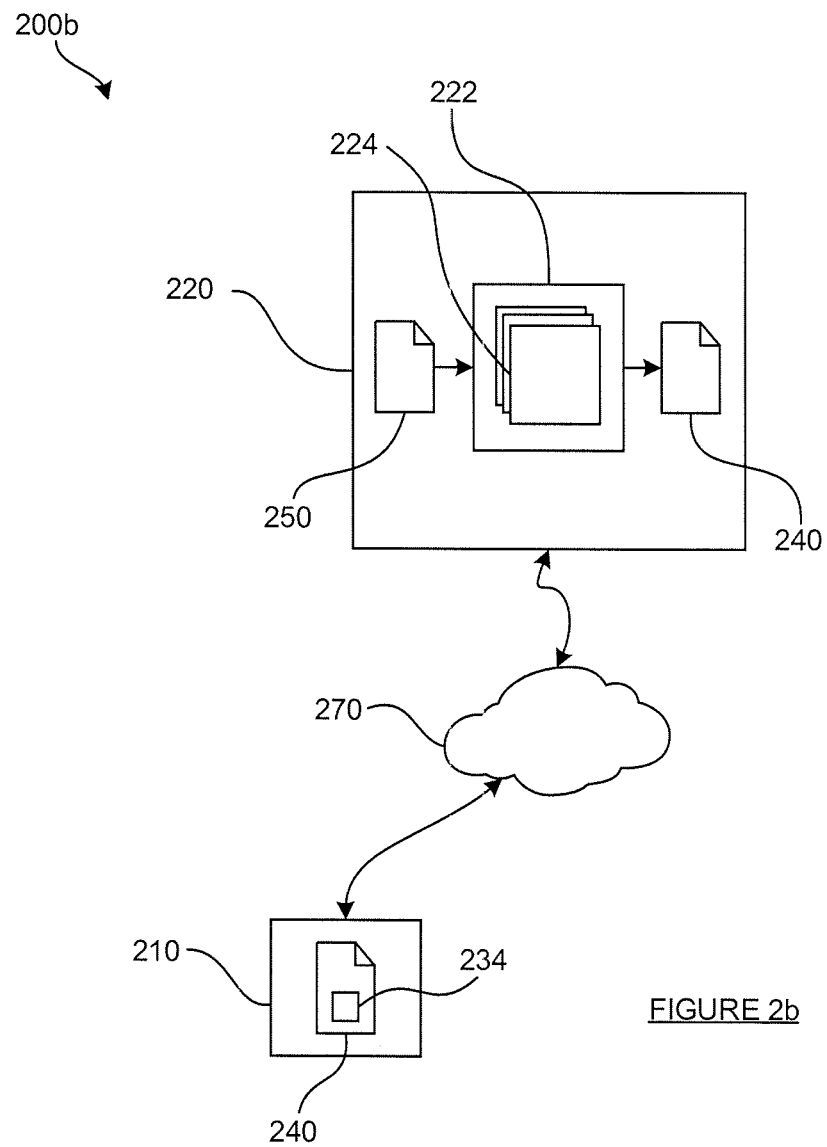

FIG. 2b schematically illustrates a further example system 200b according to some embodiments of the invention. The system 200b of FIG. 2b is the same as the system 200a of FIG. 2a, except that the system 200b does not make use of the verification system 230 and its integrity checking application 232. Instead, in the system 200b, the protected item of software 240 comprises an integrity checking module (or component) 234. In summary, during execution or runtime of the protected item of software 240, the protected item of software 240 generates verification data (or an integrity value/data, or a verification result) which the integrity checking module 234 uses to perform integrity verification functionality (as shall be described in more detail later). Again, this integrity verification functionality may be viewed as "checking the 'correctness' of the verification data".

Thus, in the system 200b, the integrity checking is carried out locally at the computer system 210, whereas in the system 200a, the integrity checking is carried out remote from the computer system 210. The system 200b provides more independence to the protected item of software 240 than in the system 200a (for example, in the system 200b, the protected item of software 240 does not require connection to the network 270 in order to communicate with the verification system 230). However, the system 200a may be viewed as more secure than the system 200b, since an attacker operating the computer system 210 would not have access to the remote verification system 230.

The initial item of software 250 and the protected item of software 240 may each comprise one or more computer programs (or software or modules) that may be stored as one or more files. Each file can contain or implement one or more functions. The initial item of software 250 and the protected item of software 240 may each be, or implement, one or more entire software applications, or one or more components for a software application (e.g. a library file), or a smaller component (e.g. a code snippet). The initial item of software 250 may comprise source code written in one or more languages, one or more of which may be the same as the language(s) for the protected item of software 240, although this is not necessary. The initial item of software 250 and the protected item of software 240 may each comprise compiled/executable code and/or source code (or interpreted code). The initial item of software 250 and the protected item of software 240 may comprise compiled code for execution as (part of) a native application at the computer system 210. The initial item of software 250 and the protected item of software 240 may comprise code for execution within a virtual machine executing on the computer system 210. The initial item of software 250 and the protected item of software 240 may comprise code for execution within a browser executing on the computer system 210 (e.g. as a webapp or code of a webpage).

The term "code" as used herein in relation to an item of software refers to instructions/commands of the item of software. In addition to code, the item of software (e.g. the initial item of software 250 and the protected item of software 240) may comprise data and/or other resources, so that execution of the "code" (or execution of the item of software) comprises executing some or all of these instructions/commands, where this execution might potentially involve using some of the data and/or other resources if present in the item of software. The term "software element" as used herein in relation to an item of software refers to code and/or other components (e.g. data and/or other resources/assets) of the item of software. Thus, a software element of (or for) an item of software may comprises (a) one or more pieces of code (e.g. one or more instructions/commands) of (or for) the item of software, and/or (b) one or more pieces of data or other resources of (or for) the item of software.

Figure 3A:
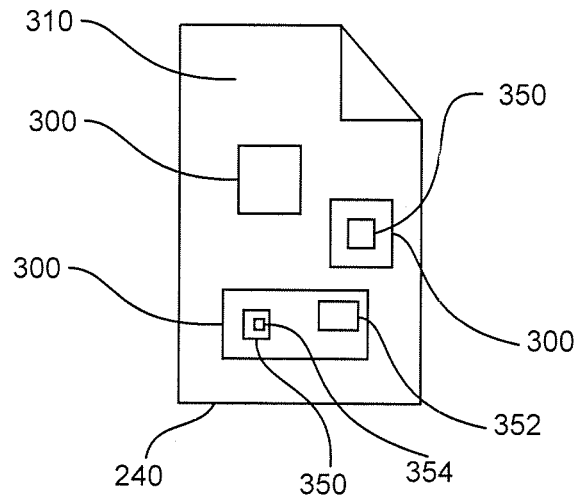
FIGS. 3a and 3b schematically illustrate an example of a protected item of software 240 for use with the system of FIGS. 2a and 2b respectively.

FIG. 3a schematically illustrates an example of the protected item of software 240 for use with the system 200a of FIG. 2a. The initial item of software 250 comprises initial software elements. The protected item of software 240 may comprise some of the initial software elements 310 from the initial item of software 250 unchanged (although it will be appreciated that the protected item of software 240 may comprise no unchanged initial software elements 310 of the initial item of software 250). The protection application 222, in applying the one or more protections to the initial item of software 250, may modify one or more parts of the initial software elements from the initial item of software 250 and/or may introduce one or more additional software elements—these modified and/or introduced software elements shall be referred to herein as update software elements 300. At least some of the update software elements 300 comprise (or implement) verification code 350. The update software elements 300 may additionally comprise data 352 for use by the verification code 350. The purpose of the verification code 350 (and the data 352 if present) shall be described in more detail later. In some embodiments, the update software elements 300 are formed from just the verification code 350 (and the data 352 if present); in other embodiments, the update software elements 300 comprise software elements other than the verification code 350 (and the data 352 if present). The verification code 350 also includes an interface/communication module 354 (as discussed in more detail later).

Figure 3B:
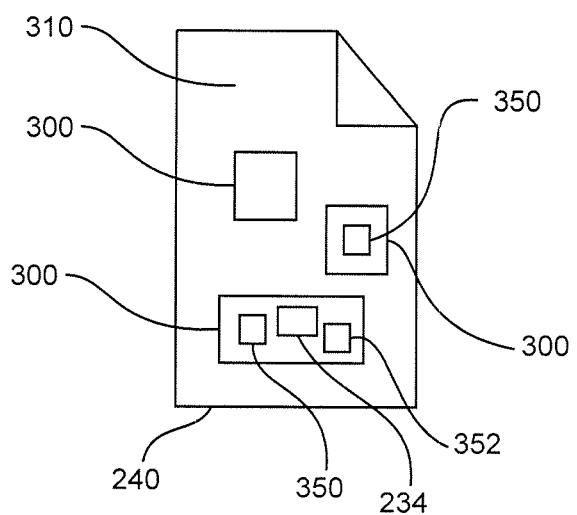

FIG. 3b schematically illustrates an example of the protected item of software 240 for use with the system 200b of FIG. 2b. This is the same as the protected item of software illustrated in FIG. 3b, except that: the update software elements 300 also include the integrity checking module 234; and the verification code 350 does not need to include the interface/communication module 354. In such embodiments, the data 352 (if present) may be data for use by the verification code 350 and/or the integrity checking module 234.

During execution of (or at runtime of) the protected item of software 240, execution of the verification code 350 generates the above-mentioned verification data. If the protected item of software is as shown in FIG. 3b (i.e. for use with the system 200b of FIG. 2b), then execution of the integrity checking module 234 uses this verification data—i.e. the verification code 350 makes the verification data available for use by the integrity checking module 234. If the protected item of software is as shown in FIG. 3a (i.e. for use with the system 200a of FIG. 2b), then execution of the verification code 350 causes the protected item of software 240 to transmit/communicate the verification data to the integrity checking application 232 at the verification system 230, so that the integrity checking application 232 can use this verification data—in particular, the interface/communication module 354 of the verification code 350 is arranged to cause the verification data to be transmitted/communicated to the integrity verification system 230, and potentially is also arranged to receive (and possibly act upon) a response from the verification system 230. The verification code 350 is arranged so that, based on the verification data, the integrity checking module 234 or the integrity checking application 232 as appropriate can check the integrity of the verification code 350, i.e. detect whether or not an unexpected/unauthorised modification relating to the verification code 350 has occurred, e.g. as a result of an attack by an attacker. A modification "relating to" (or "involving" or "concerning" or "related to") the verification code 350 may comprise one or more of: modification to the verification code 350 itself; modification to the data 352 used by the verification code 350 (if present) in the update software elements 300 or to runtime data generated by the verification code 350; modification to control flow of the verification code 350; modification to data flow of the verification code 350; modification to the verification data itself generated by the verification code 350; or any other modification that affects the value of the verification data generated by the verification code 350. Ways to try to achieve this are set out later. Thus, if an attacker, when performing an attack against the protected item of software 240, performs a modification relating to the verification code 350, then this may be detected by the integrity checking module 234 or the integrity checking application 232 as appropriate.

It may be desirable to be able to detect modification relating to other code from the initial item of software 250 (or relating to other code from the protected item of software 240). As shall be described shortly, the verification code 350 may be interleaved with this other code so that is difficult for an attacker to distinguish between the other code and the verification code 350—i.e. it may be hard for an attacker to identify the boundary between the verification code 350 and this other code or, put another way, it may be hard for an attacker to perform a modification relating to the other code, without also performing a modification relating to the verification code 350. In this way, the integrity verification afforded by/to the verification code 350 is "expanded" or "extended" out across some or all of the other code—i.e. an unexpected/unauthorised modification relating to the other code, such as a result of an attack by an attacker, may result in a modification relating to the verification code 350, which may be detectable by the integrity checking module 234 or the integrity checking application 232 as appropriate.

Similarly, it may be desirable to be able to detect modification relating to data/resources from the initial item of software 250 (or relating to data/resources from the protected item of software 240). Thus, in embodiments in which the update software elements 300 comprise the data 352, then this data 352 may be interleaved with other data/resources of the initial item of software 250 (or of the protected item of software 240) so that is difficult for an attacker to distinguish between the other data/resources and the data 352—i.e. it may be hard for an attacker to identify the boundary between the data 352 and these other data/resources or, put another way, it may be hard for an attacker to perform a modification relating to the other data/resources, without also performing a modification relating to the data 352. In this way, the integrity verification afforded by/to the data 352 is "expanded" or "extended" out across some or all of the other data/resources—i.e. an unexpected/unauthorised modification relating to the other data/resources, such as a result of an attack by an attacker, may result in a modification relating to the data 352, which may be detectable by the integrity checking module 234 or the integrity checking application 232 as appropriate.

As mentioned above, the aim of the protector module(s) 224 is to protect (or secure) the functionality or data processing of the initial item of software 250 and/or to protect (or secure) data used or processed or generated or stored by the initial item of software 250. This can be achieved by applying a variety of software protection techniques (referred to herein as "protections"), such as one or more of cloaking techniques, homomorphic data transformation, control flow transformation, white-box cryptography, key hiding, program interlocking and boundary blending.

In particular, the protected item of software 240 (i.e. the initial item of software 250 after being processed by the protector module(s) 224) will provide at least the same functionality or data processing as the initial item of software 250. However, this functionality or data processing is typically implemented in the protected item of software 240 in a manner such that an operator of the computer system 210 executing the protected item of software 240 cannot (or at least finds it difficult to) access or use this functionality or data processing from the protected item of software 240 in an unintended or unauthorised manner, whereas if that computer system 210 were to execute the initial item of software 250 instead (i.e. in an unprotected form), then the operator of the computer system 210 might have been able to launch a successful attack and thereby access or use the functionality or data processing in an unintended or unauthorised manner. Similarly, the protected item of software 240 may, due to processing by the protector module(s) 224, generate or use or access or operate on/with secret information (such as a cryptographic key or an identifier) that is represented in an encoded (or protected/obfuscated) form, using protected or obfuscated operations—this makes it more difficult (if not impossible) for an attacker to deduce or access that secret information (whereas such information may have been deducible or accessible from the initial item of software 250 without the protections having been applied).

For example:

The initial item of software 250 may comprise a decision (or a decision block or a branch point) that is based, at least in part, on one or more items of data to be processed by the initial item of software 250. If the initial item of software 250 were executed in its unprotected form, then an attacker may be able to force the initial item of software 250 to execute so that a path of execution is followed after processing the decision even though that path of execution were not meant to have been followed. For example, the decision may comprise testing whether a program variable B is TRUE or FALSE, and the initial item of software 250 may be arranged so that, if the decision identifies that B is TRUE then execution path $P_T$ is followed/executed whereas if the decision identifies that B is FALSE then execution path $P_F$ is followed/executed. In this case, the attacker could (for example by using a debugger or by rewriting the initial item of software 250) force the initial item of software 250 to follow path $P_F$ if the decision identified that B is TRUE and/or force the initial item of software 250 to follow path $P_T$ if the decision identified that B is FALSE. Therefore, in some embodiments, one or more of the protector module(s) 224 aim to prevent (or at least make it more difficult) for the attacker to do this by applying one or more software protection techniques to the decision within the initial item of software 250.

The initial item of software 250 may comprise one or more of a security-related function; an access-control function; a cryptographic function; and a rights-management function; etc. Such functions often involve the use or generation of secret data, such as one or more cryptographic keys. The processing may involve using and/or operating on or with one or more cryptographic keys. If an attacker were able to identify or determine the secret data, then a security breach has occurred and control or management of data (such as audio and/or video content) that is protected by the secret data may be circumvented. Therefore, in some embodiments, one or more of the protector module(s) 224 aim to prevent (or at least make it more difficult) for the attacker to identify or determine the one or more pieces of secret data by applying one or more software protection techniques to such functions within the initial item of software 250. This may involve arranging the protected item of software 240 so that it represents secret data in an obfuscated manner within the protected item of software 240 itself. Additionally or alternatively, this may involve arranging the protected item of software 240 with functionality to be able to dynamically read and write secret data in an obfuscated or encrypted form to/from a memory.

The protected item of software 240 may comprise additional functionality (i.e. functionality not originally in the initial item of software 250). This additional functionality may be included into the initial item of software 250 to help form the protected item of software 240 by the protector module(s) 224. This additional functionality may comprise, for example, the verification code 350 (and possibly the integrity checking module 234).

There are numerous techniques, referred to herein as "white-box obfuscation techniques", for transforming the initial item of software 250 so that it is resistant to white-box attacks (i.e. attacks that could be launched, or are available, under the white-box attack environment). Examples of such white-box obfuscation techniques can be found, in "*White-Box Cryptography and an AES Implementation*", S. Chow et al, Selected Areas in Cryptography, 9$^{th}$ Annual International Workshop, SAC 2002, Lecture Notes in Computer Science 2595 (2003), p 250-270 and "*A White-box DES Implementation for DRM Applications*", S. Chow et al, Digital Rights Management, ACM CCS-9 Workshop, DRM 2002, Lecture Notes in Computer Science 2696 (2003), p 1-15, the entire disclosures of which are incorporated herein by reference. Additional examples can be found in U.S. 61/055,694 and WO2009/140774, the entire disclosures of which are incorporated herein by reference. Some white-box obfuscation techniques (such as those described above and others set out below) enable storage and/or use, and possibly manipulation of, secret/sensitive data (such as cryptographic keys) in a transformed/secured manner from which it is difficult/impossible for an attacker to access or derive the underlying secret/sensitive data. Some white-box obfuscation techniques implement data flow obfuscation—see, for example, U.S. Pat. Nos. 7,350,085, 7,397,916, 6,594,761 and 6,842,862, the entire disclosures of which are incorporated herein by reference. Some white-box obfuscation techniques implement control flow obfuscation—see, for example, U.S. Pat. Nos. 6,779,114, 6,594,761 and 6,842,862 the entire disclosures of which are incorporated herein by reference. However, it will be appreciated that other white-box obfuscation techniques exist and that embodiments of the invention may use any white-box obfuscation techniques.

As another example, it is possible that the initial item of software 250 may be intended to be provided (or distributed) to, and used by, a particular computer system 210 (or a particular set of computer systems 210) and that it is, therefore, desirable to "lock" the initial item of software 250 to the particular computer system(s) 210, i.e. to prevent the initial item of software 250 (once protected) from executing on another computer system 210. Consequently, there are numerous techniques, referred to herein as "node-locking" protection techniques, for transforming the initial item of software 250 so that the protected item of software 240 can execute on (or be executed by) one or more predetermined/specific computer systems 210 but will not execute on other computer systems 210. Examples of such node-locking techniques can be found in WO2012/126077, the entire disclosure of which is incorporated herein by reference. However, it will be appreciated that other node-locking techniques exist and that embodiments of the invention may use any node-locking techniques.

Digital watermarking is a well-known technology. In particular, digital watermarking involves modifying an initial digital object to produce a watermarked digital object. The modifications are made so as to embed or hide particular data (referred to as payload data) into the initial digital object. The payload data may, for example, comprise data identifying ownership rights or other rights information for the digital object. The payload data may identify the (intended) recipient of the watermarked digital object, in which case the payload data is referred to as a digital fingerprint—such digital watermarking can be used to help trace the origin of unauthorised copies of the digital object. Digital watermarking can be applied to items of software. Examples of such software watermarking techniques can be found in U.S. Pat. No. 7,395,433, the entire disclosure of which is incorporated herein by reference. However, it will be appreciated that other software watermarking techniques exist and that embodiments of the invention may use any software watermarking techniques.

It may be desirable to provide different versions or instances of the initial item of software 250 to different computer systems 210 (or different users of computer systems 210). The different versions of the initial item of software 250 provide the same functionality—however, the different versions of the initial item of software 250 are programmed or implemented differently. This may help limit the impact of an attacker successfully attacking the protected item of software 240. In particular, if an attacker successfully attacks his version of the protected item of software 240, then that attack (or data, such as cryptographic keys, discovered or accessed by that attack) may not be suitable for use with different versions of the protected item of software 240. Similarly, having different protected instances 240 of the initial item of software 250 helps identify specific users (e.g. specific computer systems 210) of the protected item of software 240. Consequently, there are numerous techniques, referred to herein as "diversity" techniques, for transforming the initial item of software 250 so that different protected versions of the initial item of software 250 are generated (i.e. so that "diversity" is introduced). Examples of such diversity techniques can be found in WO2011/120123, the entire disclosure of which is incorporated herein by reference. However, it will be appreciated that other diversity techniques exist and that embodiments of the invention may use any diversity techniques.

The above-mentioned white-box obfuscation techniques, node-locking techniques, software watermarking techniques and diversity techniques are examples of software protection techniques. It will be appreciated that there are other methods of applying protection to the initial item of software 250. Thus, the term "software protection techniques", or "protections" as used herein shall be taken to mean any method of applying protection to the initial item of software 250 (with the aim of thwarting attacks by an attacker, or at least making it more difficult for an attacker to be successful with his attacks), such as any one or more of the above-mentioned white-box obfuscation techniques (which aim to secure against a white-box attack environment) and/or any one or more of the above-mentioned node-locking techniques and/or any one or more of the above-mentioned software watermarking techniques and/or any one or more of the above-mentioned diversity techniques. The protector module(s) 224 may, therefore, be arranged to apply any one or more of the above-mentioned software protection techniques or protections to the initial item of software 250 to generate the protected item of software 240—this may involve a first protector module 224 applying a software protection technique to some or all of the initial item of software 250, and then possibly one or more protector modules 224 applying a software protection technique to some or all of the output of a preceding protector module 224 (e.g. sequential application/layering of protections). The resultant protected item of software 240 may, therefore, be referred to as "protected software".

There are numerous ways in which the protector module(s) 224 may implement the above-mentioned software protection techniques within the initial item of software 250. For example, to protect the initial item of software 250, the protector module(s) 224 may modify one or more software elements within the initial item of software 250 and/or may add or introduce one or more new software elements into the initial item of software 250. The actual way in which these modifications are made or the actual way in which the new software elements are written can, of course, vary—there are, after all, an infinite number of ways of writing software to achieve the same functionality.

Numerous examples and methods for implementing the protector module(s) 224 so as to generate protected the item of software 240 from the initial item of software 250 can be found, for example, in WO2015/150391 and WO2015/150376, the entire disclosures of which are incorporated herein by reference. Further examples of protection techniques that the protector module(s) 224 may be arranged to apply can be found in WO2013/142981, WO2013/142979, WO2013/142983 and WO2013/142980, the entire disclosures of which are incorporated herein by reference.

The protection system 220 may comprise or implement a library database/store (not shown in FIG. 2a or 2b). The library database may comprise one or more pre-generated protected software modules (or functions or procedures or software snippets), and potentially multiple differently implemented/protected instances for the same underlying functionality/software. These modules are "pre-generated" insofar as they are generated independently of, and potentially prior to receipt of, the initial item of software 250. This library database may, therefore, be viewed as a repository available to the protection application 222, so that the protection application 222 (or one or more of the protector modules or components 224) can use, or include within the protected item of software 240, one or more of the modules stored within the library database. To this end, the protection system 220 may be arranged to execute a library application that generates the software modules stored in the library database. An example of such a library application to generate protected modules is described in WO2015/150376, the entire disclosure of which is incorporated herein by reference. The protection application 222 may be arranged to obtain software modules directly from the library database or may be arranged to obtain software modules from the library database via the library application. It will be appreciated that the library application may be part of, and may be executed by, an entity other than the protection system 220. Similarly, it will be appreciated that the library database may be part of, and may be provided by, an entity other than the protection system 220.

Figure 4:
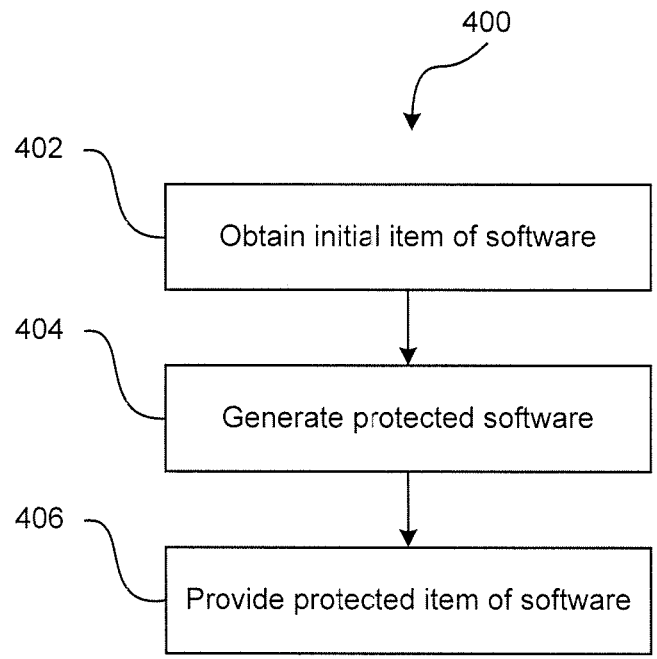
FIG. 4 is a flowchart illustrating an example method of operating a protection system according to some embodiments of the invention.
Figure 10:
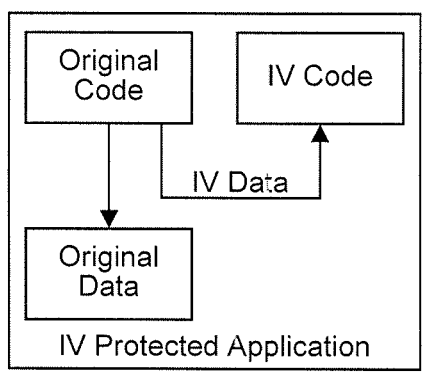
FIG. 10 schematically illustrates a traditional approach to code-based integrity verification.

FIG. 4 is a flowchart illustrating an example method 400 of operating the protection system 220 according to some embodiments of the invention.

At a step 402, the protection system 220 obtains the initial item of software 250. This may comprise the protection system 220 receiving the initial item of software 250 from a different entity. Alternatively, this may comprise the protection system 220 generating the initial item of software 250 (e.g. if the protection system 220 is being operated by an entity that generates/writes and protects its own software).

At a step 404, the protection system 220 uses the protection application 222 to generate, from the obtained initial item of software 250, the protected item of software 240. This may include: (a) including one or more modules or software elements (e.g. software elements from the library database) into the initial item of software 250 and/or (b) applying one or more of the above-mentioned software protection techniques. As mentioned, this may involve generating multiple different protected instances or versions of the initial item of software 250.

At a step 406, the protection system 220 may output the protected item of software 240. The protected item of software 240 may be stored in a database of items of software for later access—the database may be hosted by the protection system 220 or by a different entity. The protected item of software 240 may be provided to the supplier of the initial item of software 250 (e.g. in a model whereby the protection system 220 provides a protection service to external software developers). The protected item of software 240 may be provided to the computer system 210 via the network 270 (e.g. in a model whereby the protection system 220 receives a request from the computer system 210 for an item of software and provides the protected item of software 240 to the computer system 210 in response to the request—the protection system 220 could generate the protected item of software 240 in response to the request or may use an already-generated protected item of software 240 as a response to the request).

As discussed above with reference to FIGS. 3a and 3b, the protected item of software 240 comprises, or implements, the verification code 350 (and potentially comprises the data 352 too). Therefore, in embodiments of the invention, one or more of the protector module(s) 224 is arranged to add code/instructions (and potentially data too) and/or modify existing code/instructions (and potentially data too) so that the protected item of software 240 comprises, or implements, the verification code 350 (and potentially the data 352). As discussed above with reference to FIG. 3b, the protected item of software 240 may comprise, or implement, the integrity checking module 234. Therefore, in some embodiments of the invention, one or more of the protector module(s) 224 is arranged to add code/instructions (and potentially other software elements) and/or modify existing code/instructions (and potentially other software elements) so that the protected item of software 240 comprises, or implements, the integrity checking module 234.

Figure 6:
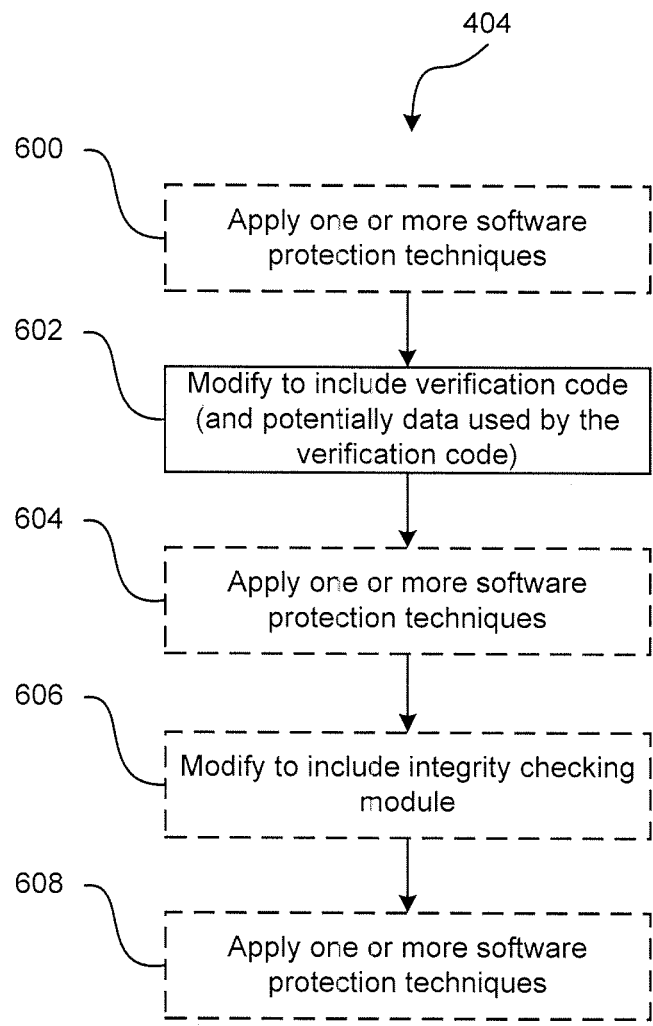
FIG. 6 is a flowchart illustrating an example implementation of a step of the method of FIG. 4 according to some embodiments of the invention.

FIG. 6 is a flowchart illustrating an example implementation of the step 404 of the method 400 according to some embodiments of the invention.

At an optional step 600, one or more of the protector modules 224 may apply one or more software protection techniques to the initial item of software 250 (or to software output by a preceding protector module 224).

At a step 602, one or more of the protector modules 224 includes the verification code 350 (and potentially the data 352 if used) into the initial item of software 250 (or into software output by a preceding protector module 224 if the step 600 is used). Thus, the step 602 (and potentially the step 600 too if used) result in the initial item of software 250 being modified so as to include the verification code 350 (and the data 352 for embodiments that make use of the data 352).

At an optional step 604, one or more of the protector modules 224 may apply one or more software protection techniques to the item of software resulting from the step 602. At an optional step 606, which is used if the protected item of software 240 is to be of the form shown in FIG. 3b, one or more of the protector modules 224 includes code (and potentially other software elements) for the integrity checking module 234 into the item of software resulting from the step 604 (if the step 604 is used) or into the item of software resulting from the step 602 (if the step 604 is not used).

At an optional step 608, one or more of the protector modules 224 may apply one or more software protection techniques to the item of software resulting from the immediately preceding step (be that the step 602, 604 or 606 as appropriate).

It will be appreciated that the order of the steps 602 and 606 may be changed. It will also be appreciated that the steps 602 and 606 may be performed together.

Preferably, the code/instructions for the verification code 350 (and for the integrity checking module 234, if present) is included or positioned/located at the step 602 (and at the step 606 if present) within the protected item of software 240 as a plurality of sections of code separated by, or interleaved with, other code/instructions that are not for implementing the verification code 350 (and not for the integrity checking module 234, if present). These sections may comprise one or more respective instructions of the verification code 350 (i.e. they may form part of, or a snippet of, the verification code 350). This is illustrated schematically in FIG. 5a, in which the verification code 350 is interleaved with other code/instructions 510 of the protected item of software 240. The protected item of software 240 may, of course, include one or more additional amounts of code/instructions 500. The other code/instructions 510 may comprise one or more of: initial/unchanged code from the initial software elements 310 of the initial item of software 250; some/all of the code from the update software elements 300 other than the verification code 350; some/all of the code for the integrity checking module 234 (if present). Such interleaving, or distribution, makes it harder for an attacker to isolate the verification code 350 (and the integrity checking module 234, if present). Such interleaving, or distribution, also makes it difficult for the attacker to implement a modification relating to the code/instructions 510 without also inducing a modification relating to the verification code 350. The code/instructions 510 may be code/instructions for which integrity verification is desirable, which is why the verification code 350 may be selected to be interleaved with this code/instructions 510 because, as discussed above, modification by an attacker relating to such code/instructions 510 is likely to induce a modification relating to the verification code 350, which, as discussed in detail below, may be detectable by the integrity checking module 234 or the integrity checking application 232. Preferably, the verification code 350 (and the code/instructions for the integrity checking module 234, if present) is indistinguishable from the other code 510 (e.g. they both use same kind of operations/variables/etc.), so that the verification code 350 looks as if it a natural part of the surrounding code 510 and it is harder for an attacker to isolate the verification code 350 from the surrounding code 510.

As mentioned, some embodiments of the invention include, and make use of, the data 352. In such embodiments, the data 352 is preferably included or positioned/located at the step 602 (and/or potentially at the step 606 if present) within the protected item of software 240 as a plurality of sections of data separated by, or interleaved with, other data and/or resources. This is illustrated schematically in FIG. 5b, in which the data 352 is interleaved with other data (and/or resources or assets) 530 of the protected item of software 240. The protected item of software 240 may, of course, include one or more additional amounts of data 520.

The other data 530 may comprise one or more of: data from the initial software elements 310 of the initial item of software 250; some/all of the data from the update software elements 300 other than the data 352. Such interleaving, or distribution, makes it harder for an attacker to isolate the data 352. Such interleaving, or distribution, also makes it difficult for the attacker to implement a modification relating to the data 530 without also inducing a modification relating to the data 352. The data 530 may be data for which integrity verification is desirable, which is why the data 352 may be selected to be interleaved with this data 530 because, as discussed above, modification by an attacker relating to such data 530 is likely to induce a modification relating to the data 352, which, as discussed in detail below, may be detectable by the integrity checking module 234 or the integrity checking application 232. Preferably, the data 352 is indistinguishable from the other data 530 (e.g. they both use same format for the data) so that the data 352 looks as if it a natural part of the surrounding data 530 and it is harder for an attacker to isolate the data 352 from the surrounding data 530.

Preferably, one or more of the protector module(s) 224 is arranged apply one or more software protections (e.g. obfuscation) to the verification code 350 included in the protected item of software 240 (and to the integrity checking module 234 and the data 352 if present). This may occur, for example, at the step 604 and/or the step 608. Thus, for example, the protection application 222 may use one or more first protector modules 224 to include the verification code 350 (and possibly the integrity checking module 234 and the data 352) into the initial item of software 250 (or an output of a preceding protector module 224) and then use one or more second protector modules 224 to apply one or more protections (e.g. protections that aim to secure against the white-box attack environment) to at least the verification code 350 (and potentially to the integrity checking module 234 and/or the data 352 if present) and, preferably, to the code/instructions 510 (and potentially the data 530) for which integrity verification is desirable. This makes it even harder for an attacker to isolate and attack the verification code 350 (and the integrity checking module 234 and/or the data 352, if present) and/or the code/instructions 510 and/or the data 530 whilst circumventing the protection provided by the verification code 350.

Figure 9:
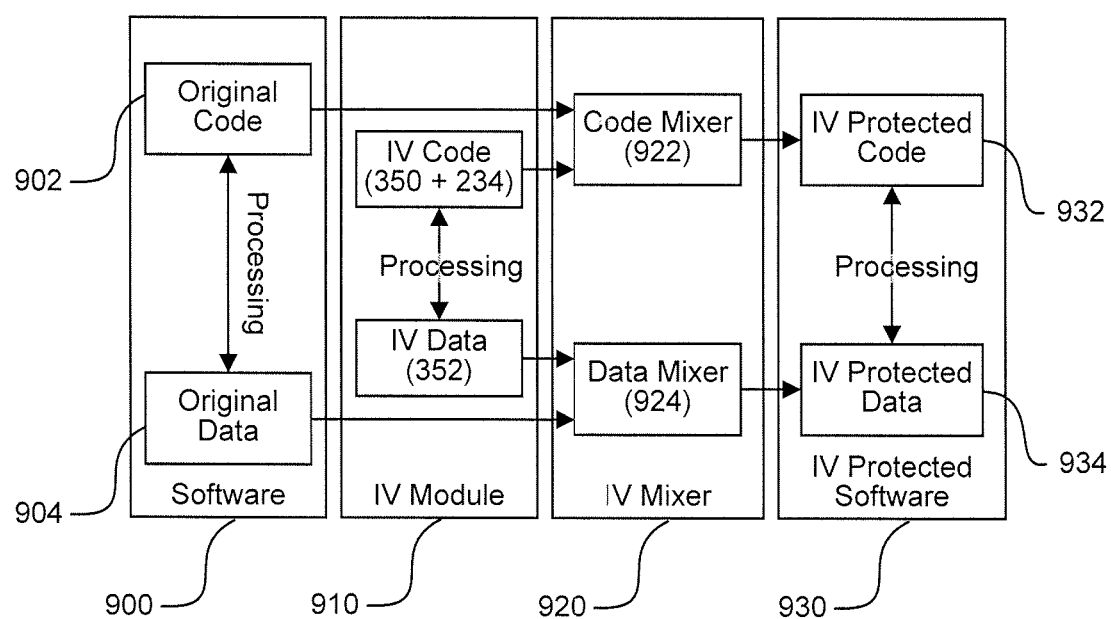
FIG. 9 schematically illustrates an example method of how to protect an item of software according to some embodiments of the invention.

FIG. 9 schematically illustrates an example method of how to protect an item of software according to some embodiments of the invention. In particular, FIG. 9 schematically illustrates processing that may be carried out at the step 602 (and possibly the step 606 if included).

An item of software 900 is to be protected at the step 602 (and possibly the step 606 if included). As set out above, this item of software 900 may be the initial item of software 250 or may be the initial item of software 250 after one or more protections have been applied thereto at the step 600 (if included). The item of software 900 may include various software elements, including code 902 and data 904. The code 902 is arranged to use the data 904 to carry out its intended/designed functionality.

As discussed above, embodiments of the invention make use of verification code 350. Additionally, in some embodiments, the protected item of software 240 comprises the integrity checking module 234. Some embodiments of the invention (as shown in FIG. 9) make use of additional data 352 that is introduced into the item of software 900 being protected. Thus, the verification code 350 (and the integrity checking module 234 if present and the data 352 if present) together may be viewed as an IV module 910.

As set out in more detail later, in some embodiments of the invention, the IV module 910 carries out the integrity verification processing using its own code 350, 234 and data 352, but does not perform computations based on, or involving, the code 902 or the data 904 of the item of software 900. Note, though, that the IV module 910 may make use of runtime data generated by the code 902 (e.g. using the runtime data as a source of entropy)—however, results/outputs generated by the IV module 910 (such as the verification data) are not based directly on the code 902 or the data 904 of the item of software 900 (i.e. those software elements are not read by the IV module 910 and then processed as data, unlike in traditional integrity verification).

Figure 5A:
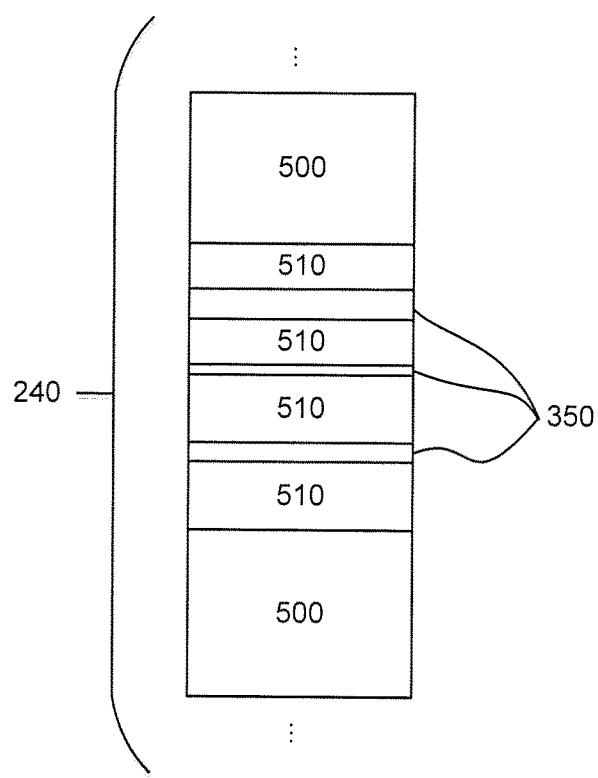
FIG. 5a schematically illustrates the inclusion of verification code within a protected item of software according to some embodiments of the invention.
Figure 5B:
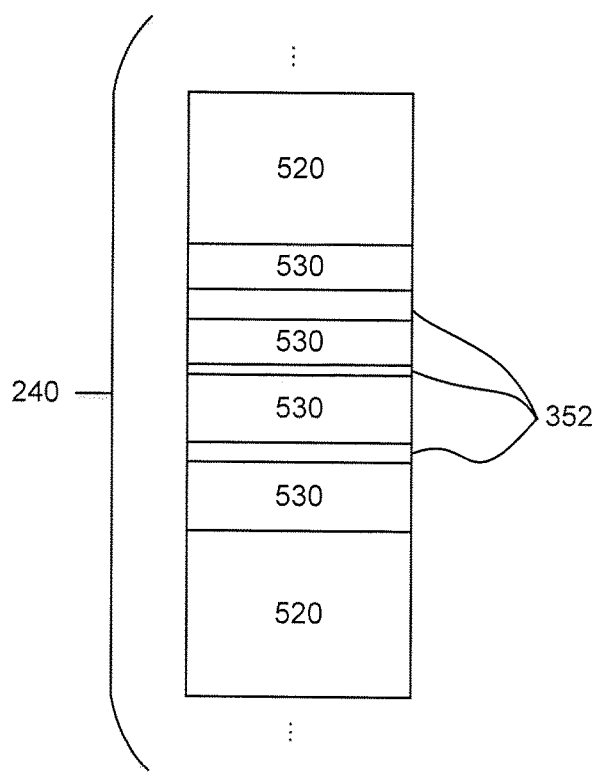
FIG. 5b schematically illustrates the inclusion of data within a protected item of software according to some embodiments of the invention.

At the step 602 (and the step 606 if used) the verification code 350 (and the integrity checking module 234 and the data 352 if used) are introduced into the item of software 900 to generate a protected item of software 930 (i.e. the output of the step 602 or 606 as appropriate). The protector module(s) 224 that are carry out the step 602 (and possibly the step 606) may, therefore, comprise a mixing module 920 that is arranged to combine the IV module 910 with the item of software 900. In particular, the mixing module 920 may comprise a code mixing module 922 that is arranged to combine, or integrate, the code 902 with the verification code 350 (and possibly the code of the integrity checking module 234) to generated protected code 932 of the protected item of software 930—this may be carried out as shown in FIG. 5a. Similarly, the mixing module 920 may comprise a data mixing module 924 that is arranged to combine, or integrate, the data 904 with the data 352 to generate protected data 934 of the protected item of software 930—this may be carried out as shown in FIG. 5b.

Figure 8:
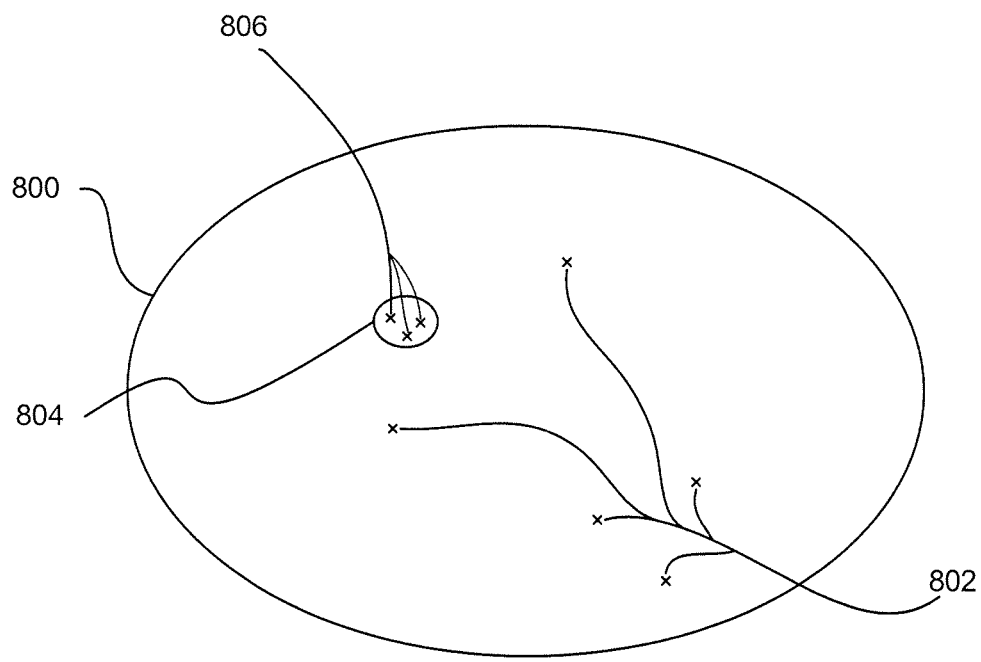
FIG. 8 schematically illustrates the manner by which the integrity verification operates according to some embodiments of the invention.

FIG. 8 schematically illustrates the manner by which the integrity verification operates according to some embodiments of the invention. In particular, as mentioned above, and as shall be described in more detail below, the verification code 350 generates verification data. The verification data is (or comprises, or represents) an element (i.e. a member) of a predetermined first set 800 of data elements. In the absence of a modification relating to the verification code 350, the verification data is (or comprises, or represents) an element of a predetermined second set 804 of data elements, wherein this second set 804 of data elements is a subset of the first set 800 of data elements. The first set 800 has a plurality of data elements (shown as data elements 802 in FIG. 8)—let the number of data elements 802 in the first set 800 be $N_1$. The second set 804 has a plurality of data elements (shown as data elements 806 in FIG. 8)—let the number of data elements 806 in the second set 804 be $N_2$.

As shall be discussed in more detail below, it should be computationally infeasible to determine a data element of the first set 800 that is also a data element 806 of the second set 804 without knowledge of certain parameters (or data derived from, or based upon, or related to those parameters). For example, $N_2$ is preferably substantially smaller than $N_1$ (i.e. the ratio $N_1/N_2$ is substantially large, or $N_1$ is preferably a number M of orders of magnitude larger that $N_2$, wherein the larger the value of M, the higher the level of security). Modification relating to the verification code 350 may affect the generation of the verification data. For example, one or more of the parameters may be part of, or represented within, the actual verification code 350 itself, and modification of the verification code 350 may change these parameters so that the verification data is generated based on incorrect parameters—for example, a parameter may be a particular integer (such as 35), and the verification code may comprise the statement x=x+35 for some variable x. Similarly, one or more of the parameters may be part of, or represented within, the data 352 (if present), and modification of the data 352 may change these parameters so that the verification data is generated based on incorrect parameters—for example, a parameter may be a particular integer (such as 35), and the verification code may comprise the statement x=x+p for some static variable p that has been defined with the parameter value of 35. As another example, the verification code 350 performs various computations (or operations) based on (or using) the parameters and this may involve generating intermediate data that is used for subsequent computations—the modification relating to the verification code 350 may change how the computations are performed (e.g. due to a change in control flow or a change to the verification code 350 itself) or may change the value of the intermediate data (e.g. due to a change in memory contents being used by the verification code 350 or to a change in the data flow) so that the verification data is generated based on incorrect computations and/or data. Thus, modification relating to the verification code 350 will almost certainly result in the verification data being (or comprising, or representing) a data element 802 that is in the first set 800 but not a data element 806 of the second set 804. For example, if the verification code 350 is arranged so that modification of the verification code 350 results in the verification data being a random (or pseudo-random) value, then, after such a modification, the probability of the verification data being (or comprising, or representing) a data element 806 of the second set 804 is $N_2/N_1$ which, as discussed below, is preferably a very low probability. The verification code 350 may be written so as to be "fragile", in the sense that it is sensitive to changes.

The one or more parameters are, preferably, contained in the verification code 350 and/or the data 352 that were introduced when protecting the initial item of software 250 so as to generate the protected item of software 240. In such embodiments, the integrity verification is not then based on calculations using the original software elements of the initial item of software 250 (other than, potentially, runtime data generated by those software elements—i.e. those software elements are themselves not read as data and processed as data by the verification code 350). Instead, the integrity verification in such embodiments relies on the data integrity verification carried out by the verification code 350 using the one or more parameters, with the code 510 and the data 530 "surrounding" the verification code 350 and/or the data 352 (as shown in FIGS. 5a and 5b) inheriting protection by virtue of being interleaved with the verification code 350 and/or the data 352.

The term "integrity checker" shall be used to refer to the integrity checking application 232 (or the verification system 230) if embodiments illustrated in FIGS. 2a and 3a are being used, or to refer to the integrity checking module 234 if embodiments illustrated in FIGS. 2b and 3b are being used. The integrity checker uses verification data to determine whether or not an unexpected/unauthorised modification relating to the verification code 350 has occurred. In particular, the integrity checker determines whether or not the verification data is (or comprises, or represents) a data element 806 of the second set 804—if the verification data is (or comprises, or represents) a data element 806 of the second set 804, then the integrity checker concludes (or identifies/determines) that no modification relating to the verification code 350 has occurred; if the verification data is not (or does not comprise, or do not represent) a data element 806 of the second set 804, then the integrity checker concludes (or identifies/determines) that a modification relating to the verification code 350 has occurred.

Figure 7:
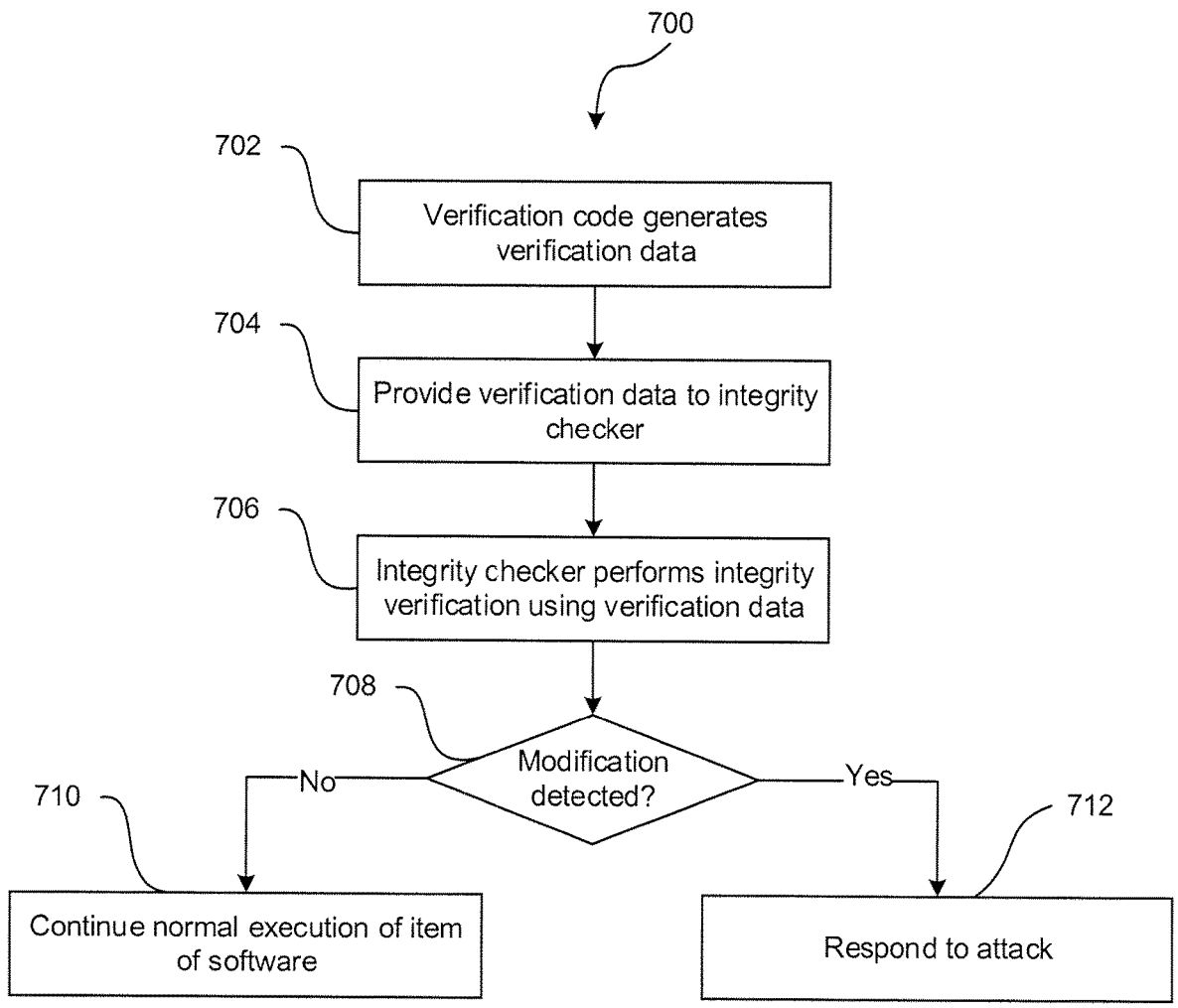
FIG. 7 is a flowchart illustrating an example method carried out by verification code in conjunction with an integrity checker, in accordance with some embodiments of the invention.

FIG. 7 is a flowchart illustrating an example method 700 carried out by the verification code 350 in conjunction with the relevant integrity checker, in accordance with some embodiments of the invention.

At a step 702, at runtime of the protected item of software 240, the verification code 350 generates the verification data. The verification data is generated using: (a) runtime data generated by one or more portions of code of the protected item of software 240; and (b) one or more predetermined parameters.

In the absence of a modification relating to the verification code 350, use of the one or more predetermined parameters by the verification code 350 ensures that the verification data is (or comprises, or represents) a data element 806 of the second set 804 and use of the runtime data by the verification code 350 controls (or determines or selects) which data element 806 of the second set 804 is (or is comprised in or represented by) the generated verification data. Thus, in the absence of an attack by an attacker against the protected item of software 240, the verification code 350 should execute so as to produce verification data that is (or comprises, or represents) a data element 806 of the second set 804—this means that the integrity checker can conclude (or identify/determine) that no attack against the protected item of software 240 has been launched.

In some embodiments, the runtime data is preferably selected so that, if the verification code 350 is executed multiple times, then the value of the runtime data $R_i$ used by the verification code 350 at the $i^{th}$ execution of the verification code 350 is different from the value of the runtime data $R_j$ used by the verification code 350 at the $j^{th}$ execution of the verification code 350 (for positive integers i and j with i≠j). Thus, the verification data generated at the $i^{th}$ execution of the verification code 350 (in dependence upon R) is different from the verification data generated at the $i^{th}$ execution of the verification code 350 (in dependence upon $R_j$). This can be achieved, for example, by ensuring that the value of the runtime data is dependent on one or more of: input provided by the user of the computer system 210; data/content being processed by the computer system 210 (e.g. documents being processed; data being decrypted or encrypted; multimedia data being decoded; etc.); data relating to the current execution environment of the computer system 210; current date/time data; any source of entropy; etc. The runtime data preferably acts as a source of (pseudo-)random data or entropy. Such non-repeated runtime data helps prevent replay attacks by an attacker (i.e. this stops an attacker from detecting valid verification data and reusing that valid verification data subsequently), as set out below.

The one or more portions of code that generate this runtime data may be any part of the protected item of software 240. The one or more portions of code are, preferably, code/instructions 510 of the protected item of software 240 with which the verification code 350 is interleaved.

The step 602 (at which the verification code 350 is included into the initial item of software 250 or into software output by the step 600 if used) may comprise identifying one or more sources (or amounts) of runtime data within the initial item of software 250 (or in the software output by the step 600 if used) for use by the verification code 350. If such sources (or amounts) of runtime data are not available within the initial item of software 250 (or in the software output by the step 600 if used), then the step 602 may comprise including code within the initial item of software 250 (or in the software output by the step 600 if used) to act as a source of runtime data (e.g. including instructions that serve as a random number generator that might be seeded based on, for example, a current configuration or operational status of the computer system 210). Additionally, or alternatively, the step 602 may comprise including code within the initial item of software 250 (or in the software output by the step 600 if used) so as to transform (or convert or encode) runtime data into transformed runtime data to be used by the verification code 350, where the transformation is arranged such that the transformed runtime data has a higher degree of randomness that the non-transformed runtime data. For example, the initial runtime data may comprise a k-bit number that, at runtime, assumes values that are biased towards 0, whereas after a transformation, this transformed k-bit number may assume values with a more uniform distribution across the full range of $2^k$ possible values, or at least values distributed more diversely across the full range of $2^k$ possible values.

One or more of the one or more predetermined parameters may be included within the verification code 350 for use by the verification code 350. This may be in the form of actual amounts of data values (e.g. constants) used by the verification code 350; additionally or alternatively the instructions of the verification code 350 may intrinsically implement the one or more predetermined parameters by virtue of the operations they perform. One or more of the one or more predetermined parameters may be included within the data 352 (if used). Software protections applied at the steps 604 and/or 608 may be arranged to obfuscate, or make it difficult for an attacker to deduce or identify or modify the one or more predetermined parameters (for example, by applying protections aimed at securing against the white-box attack environment to hide the values of the one or more predetermined parameters within the protected item of software 240). The step 602 may involve the protection application 222 generating the one or more predetermined parameters (or data based/related to those one or more predetermined parameters).

The verification data represents a data element of the first set 800. Here, "represent" may mean that the verification data is simply be a data element of the first set 800. For example, if the first set 800 is the set of all possible $2^n$ n-bit numbers (for some positive integer n), then the verification data may simply be an n-bit number. Alternatively, "represent" may mean that the verification data may comprise the data element of the first set 800 but may have additional data. For example, if the first set 800 is the set of all possible $2^n$ n-bit numbers (for some positive integer n), then the verification data may be an m-bit number (for some integer m greater than n), where the binary representation of this m-bit number comprises n bits that together form the n-bit data element of the first set 800. Alternatively, "represent" may mean that the verification data may be (or may comprise) a representation of, or transformation of, the data element of the first set 800. For example, if the first set 800 is the set of all possible $2^n$ n-bit numbers (for some positive integer n), then the verification data may be an m-bit number (for some integer m greater than or equal to n), where this m-bit number comprises an encoded or transformed version y of the data element x of the first set 800 (e.g. y=ax+b for some positive integers a and b). The verification data may then comprise an indication of the particular encoding or transformation used, to thereby assist the integrity checker with its processing, as set out below (e.g. an indication of which values of a and b are used, either explicitly or via a reference to a look-up table of values for a and b).

At a step 704, the verification data is provided (or made available) to the integrity checker. If the integrity checker is the integrity checking application 232 (or the verification system 230), then the step 704 may involve the protected item of software 240 (or, more specifically, the interface/communication module 354) communicating or transferring the verification data to the integrity checker via the network 270. For example, the protected item of software 240 may send a request to the integrity checker, where this request comprises the verification data, the request to cause the integrity checker to perform its verification processing based on the verification data in the request. Alternatively, if the integrity checker is the integrity checking module 234, then the step 704 may involve storing the verification data in memory at the computer system 210 shared by both the verification code 350 and the integrity checker for subsequent use by the integrity checker, or communicating or passing the verification data to the integrity checker. For example, the integrity checker could be run as a thread or process separate from the thread or process for the verification code 350, with (a) the integrity checker detecting a change to the verification data being stored in the shared memory (which is indicative of the verification code 350 having updated the verification data, thereby acting as an implicit request for the integrity checker to perform its verification processing based on the verification data) or (b) the integrity checker periodically performing its verification processing based on the verification data currently being stored in the shared memory. Alternatively, the verification code 350 may send a message or signal to the integrity checker 350, or may make a function/procedure call to the integrity checker 350, with this message/signal/call comprising or passing the verification data, so that the integrity checker 350 can then perform its verification processing based on this verification data.

At a step 706, the integrity checkers performs its integrity verification processing using the verification data provided or made available at the step 704. In particular, the integrity checker determines whether the verification data represents a data element 806 of the second set 804.

As set out above, the verification data may simply be an element of the first set 800. For example, if the first set 800 is the set of all possible $2^n$ n-bit numbers (for some positive integer n), then the verification data may simply be an n-bit number. Thus, the step 706 may involve the integrity checker checking whether the verification data itself is a data element 806 of the second set 804 (e.g. whether this n-bit number is a value in the second set 804).

As set out above, the verification data may comprise a data element of the first set 800 but may have additional data. For example, if the first set 800 is the set of all possible n-bit numbers (for some positive integer n), then the verification data may be an m-bit number (for some integer m greater than n), where the binary representation of this m-bit number comprises n bits that together form the n-bit data element of the first set 800.

Thus, the step 706 may involve the integrity checker checking whether the part of the verification data other than the additional data is a data element 806 of the second set 804 (e.g. whether this n-bit number is a value in the second set 804).

As set out above, the verification data may be (or may comprise) a representation of, or transformation of, a data element of the first set 800. For example, if the first set 800 is the set of all possible $2^n$ n-bit numbers (for some positive integer n), then the verification data may be an m-bit number (for some integer m greater than or equal to n), where this m-bit number comprises an encoded or transformed version y of the data element x of the first set 800 (e.g. y=ax+b for some positive integers a and b). Thus, the step 706 may involve the integrity checker performing an inverse of the encoding or transformation on the encoded or transformed version of the data element of the first set 800 to derive a decoded value, and checking whether the decoded value is a data element 806 of the second set 804 (e.g. whether the resulting n-bit number is a value in the second set 804). As mentioned, the verification data may comprise an indication of the particular encoding or transformation used by the verification code 350. For example, the verification code 350 may be arranged to use a specific encoding out of a possible set of T different encodings which the integrity checker is configured to support—the indication may identify this particular encoding, so that the integrity checker can then identify which encoding the verification code 350 has used and, therefore, how to perform the corresponding decoding to determine the decoded value. The specific encoding used by the verification code 350 may vary between different instances of the protected item of software 240. Alternatively, the verification code 350 may be arranged to choose an encoding out of the possible set of T different encodings which the integrity checker is configured to support, so that the encoding used may change each time the verification code 350 provides verification data to the integrity checker—the indication may identify the chosen encoding, so that the integrity checker can then identify which encoding the verification code 350 has used and, therefore, how to perform the corresponding decoding to determine the decoded value.

The integrity checker performs one or more tests based on the verification data. The outcome of each test is an indication of whether or not a modification relating to the verification code 350 has occurred. If none of the tests indicates that a modification relating to the verification code 350 has occurred, then the integrity checker concludes that a modification relating to the verification code 350 has not occurred; if at least one of the tests indicates that a modification relating to the verification code 350 has occurred, then the integrity checker concludes that a modification relating to the verification code 350 has occurred.

One of the tests that the integrity checker performs is as follows. The integrity checker (i) identifies (or concludes or determines) that a modification relating to the verification code 350 has not occurred if the verification data represents a data element 806 of the second set 804, and (ii) identifies (or concludes or determines) that a modification relating to the verification code 350 has occurred if the verification data does not represent a data element 806 of the second set 804. This modification may, for example, be the result of an attack by an attacker on the protected item of software 240 (e.g. a modification to one or more of the code of the protected item of software 240, data used by the protected item of software 240, control flow of the protected item of software 240, data flow of the protected item of software 240, or any other modification affecting the result of the computation/derivation of the verification data). The attacker may not have intended to make a modification relating to the verification code 350 itself but may, instead, have wanted to make a modification relating to other code or data of the protected item of software, such as code 510 with which the verification code 350 is interleaved, and/or data 530 which the data 352 is interleaved—thus, the modification relating to the verification code 350 by the attacker may be inadvertent. However, the interleaving (if used) and the software protections (if used at the steps 604 and/or 608), mean that an attacker may well induce such an inadvertent modification relating to the verification code 350 whilst trying to attack a different part of the protected item of software 240—in this way, the protection provided by the verification code 350 is extended out to other parts of the protected item of software 240 (such as the code 510 and the data 530).

In some embodiments, the integrity checker may perform an additional check as follows. The integrity checker may check or identify whether the current verification data (with its current value) provided by the verification code 350 is the same as verification data previously provided by the verification code 350 (or whether the current data element of the first set 800 represented by the current verification data is the same data element as the data element represent by verification data previously provided by the verification code 350). As mentioned above, the purpose of the runtime data is to control (or determine or select) which data element 806 of the second set 804 is (or is comprised in or represented by) the generated verification data. If the runtime data is chosen to be substantially random (or pseudo random), and should therefore be different for (substantially) each execution of the verification code 350, then the verification data generated at each execution of the verification code 350 should be different from (substantially all) previously generated verification data. In other words, the integrity checker may identify whether the received verification data corresponds to verification data previously received in relation to the protected item of software 240 and: (a) if the received verification data does not correspond to verification data previously received in relation to the protected item of software 240, the integrity checker may identify that a modification relating to the verification code 350 has not occurred; and (b) if the received verification data corresponds to verification data previously received in relation to the protected item of software 240, the integrity checker may identify that a modification relating to the verification code 350 has occurred. Thus, the integrity checker may store, for one or more instances of the protected item of software 240, a respective history or log of verification data provided to the integrity checker at the step 704 by that instance of the protected item of software 240 (or a history or log of data elements of the set 800 represented by verification data provided to the integrity checker at the step 704 by that protected item of software 240) and, at the step 706, the integrity checker may determine whether current verification data (or a current data element of the first set 800 represented by verification data) provided by an instance of the protected item of software 240 is the same as any verification data (or data elements of the first set 800) in the log for that instance of the protected item of software 240—if not, then this test may identify (or conclude or determine) that a modification relating to the verification code 350 has not occurred and, otherwise, the test may identify (or conclude or determine) that a modification related to the verification code 350 has occurred (since a repeated data element or a repeated verification data should not occur without a modification/attack taking place).

If, at a step 708, the integrity checker determines that no modification relating to the verification code 350 has occurred, then processing continues at a step 710. At the step 710, normal execution of the protected item of software 240 may continue. This may involve the integrity checker taking no further action in respect of the current amount of verification data. Alternatively, the protected item of software 240 may be configured to expect a reply from the integrity checker in response to providing the verification data at the step 704 (for example, the verification data may have been provided to the integrity checker as part of a request or message to the integrity checker, with the protected item of software 240 waiting for the response to the request/message in order to continue execution). Thus, the integrity checker may provide a response back to the protected item of software 240 to enable the protected item of software 240 to continue its normal execution. For example, the response may comprise a predetermined code/flag that indicates to the verification code 350 that the verification data was successfully verified. Alternatively, the request or message may be a request for a particular service from the integrity checker (e.g. to be granted access to an online account)—the response may therefore be to enable or allow or provide the requested service (e.g. grant access to the online account). Alternatively, the request or message may be a request for a particular amount of data (e.g. a decryption key)—the response may therefore be to provide the requested data.

If, however, at the step 708 the integrity checker determines that modification relating to the verification code 350 has occurred, then processing continues at a step 712. At the step 712, a response may be provided to the suspected attack. This may take many forms. For example, the integrity checker may cause the protected item of software 240 to cease execution. Alternatively, the protected item of software 240 may be configured to expect a reply from the integrity checker in response to providing the verification data at the step 704 (for example, the verification data may have been provided to the integrity checker as part of a request or message to the integrity checker, with the protected item of software 240 waiting for the response to the request/message in order to continue execution). Thus, the integrity checker may provide a response back to the protected item of software 240 to prevent the protected item of software 240 from continuing its normal execution. For example, the response may comprise a predetermined code/flag that indicates to the verification code 350 that the verification data was not successfully verified. Alternatively, the request or message may be a request for a particular service from the integrity checker (e.g. to be granted access to an online account)—the response may therefore be to disable or disallow or not provide the requested service (e.g. deny access to the online account). Alternatively, the request or message may be a request for a particular amount of data (e.g. a decryption key)—the response may therefore be to provide unsuitable data (e.g. an incorrect decryption key).

It will be appreciated that the integrity checker may store, or have access to, some or all of the predetermined parameters (or at least corresponding data/parameters) to enable the integrity checker to carry out its processing on the verification data at the step 706. If the integrity checker is the integrity checking module 234, then the integrity checker may have access to the same predetermined parameters as are used by the verification code 350. Additionally, or alternatively, the integrity checker may comprise, or have access to, a database or store in which the predetermined parameters (or at least corresponding data/parameters) are stored to enable the integrity checker to carry out its processing on the verification data at the step 706. If the integrity checker is the integrity checking application 232 (or the verification system 230), then the integrity checker may comprise, or have access to, a database or store in which the predetermined parameters (or at least corresponding data/parameters) are stored to enable the integrity checker to carry out its processing on the verification data at the step 706.

The integrity checker may be configured by the protection system 220 to store, or have access to, some or all of the predetermined parameters (or at least corresponding data/ parameters) to enable the integrity checker to carry out its processing on the verification data at the step 706. This may occur, for example when the protection application 222 includes the integrity checking module 234 into the protected item of software 240 (at the optional step 606) or when the protected item of software 240 is provided at the step 406 (e.g. the database used by the integrity checking application 232 could be updated to include the predetermined parameters (or at least corresponding data/parameters) corresponding to the provided protected item of software 240).

It will be appreciated that the predetermined parameters may be the same for all instances of the protected item of software 240. Alternatively, in some embodiments, some or all of the predetermined parameters may differ between different instances of the protected item of software 240 (i.e. instances of the protected item of software 240 may be diversify based, at least in part, on the predetermined parameters used by the verification code 350).

A number of examples of the integrity verification that may be performed with embodiments of the invention are set out below.

Example 1

With this first example:

The first set 800 is the set n-bit numbers for some positive integer n (such as n=64). Thus data elements 802 of the first set are n-bit values.

The predetermined parameters comprise:
  an encryption key K;
  a predetermined bit sequence B comprising m bits (where m is a positive integer with m<n); and
  for each of the m bits of the predetermined bit sequence B, a corresponding location within an n-bit value (i.e. for each bit $b_i$ of B, i=1, ..., m, a corresponding index p, in the range 1, ..., n indicating a bit location in a binary representation of an n-bit value). Each of the m bits of B has a different respective location.

The second set 804 is the set of all elements V of the first set 800 (i.e. n-bit numbers) for which V is an encrypted version of a n-bit value B*, wherein the n-bit bit-representation of B* comprises the m bits of the bit sequence B at their respective predetermined locations within the n-bit bit-representation of B*, wherein the encryption of B* uses the encryption key K.

Thus, the generation of the verification data at the step 702 may comprise:
  Forming an n-bit value B* using:
    the m bits of the bit sequence B at their respective predetermined locations within the n-bit bit-representation of B*.
    n-m bits from the runtime data at the remaining locations within the n-bit bit-representation of B*. Thus, the runtime data will control or select which data element 806 of the second set 804 is represented by the verification data.
  Encrypting the n-bit value B* using the encryption key K to form the verification data D.

Thus, the verification performed at the step 706 may comprise:
  Decrypting received n-bit verification data D to obtain an n-bit value W (which will, therefore, be a data element of the first set 800).
  Identifying whether the n-bit value W has the m bits of the bit sequence B at the respective predetermined locations within the n-bit bit-representation of W. If the n-bit value W does have the m bits of the bit sequence B at the respective predetermined locations within the n-bit bit-representation of W, then the verification data D is a data element 806 of the second set 804 and the integrity checker may conclude that a modification relating to the verification code 350 has not occurred; otherwise, the verification data D is not a data element 806 of the second set 804 and the integrity checker may conclude that a modification relating to the verification code 350 has occurred.

The encryption key K may be a symmetric encryption key, so that the integrity checker would then need to know the key K to carry out the decryption, the predetermined bit sequence B, and the predetermined locations for each of the bits of B in order to carry out the step 706. The encryption key K may be a public key of the integrity checker, so that the integrity checker would then need to know the private key corresponding to the key K to carry out the decryption, the predetermined bit sequence B, and the predetermined locations for each of the bits of B in order to carry out the step 706.

It will be appreciated that, instead of performing an encryption operation using the key K, any other invertible keyed/seeded operation or transformation could be used instead.

As the encryption operation aims to produce ciphertext that appears to be random (or pseudo-random), it will be appreciated that, for example, a modification by an attacker to the predetermined parameters is likely to induce a change in the verification data generated. For an arbitrary amount of verification data D (e.g. verification data D generated after an attack by an attacker), the probability that the n-bit value W generated after decrypting D comprises the m bits of the bit sequence B at the correct locations is $1/(2^m)$—the value of m can, therefore, be chosen to be large enough so that this probability is less than a predetermined threshold probability $T_1$ (where the smaller the value of $T_1$, the greater security and more reliable the integrity verification). Given this, and the nature of the encryption algorithms, it will be appreciated that it is computationally infeasible for an attacker to generate a data element of the second set 804 without knowledge of the predetermined parameters. The number of data elements of the second set 804 is $2^{(n-m)}$—therefore, if n is substantially larger than m, the probability of repeating an amount of verification data D will be very small (assuming that the runtime data is sufficiently random). Indeed, n can be chosen to be large enough so that this probability is less than a predetermined threshold probability $T_2$ (where the smaller the value of $T_2$, the greater security and more reliable the integrity verification).

Example 2

Example 2 is similar to example 1, but viewed from a different perspective. In particular, with this first example:
  The first set 800 is the set n-bit numbers for some positive integer n (such as n=64). Thus data elements 802 of the first set are n-bit values.
  The predetermined parameters comprise:
    a predetermined bit sequence B comprising m bits (where m is a positive integer with m<n);
    for each of the m bits of the predetermined bit sequence B, a corresponding location within an n-bit value (i.e. for each bit $b_i$ of B, i=1, ..., m, a corresponding index $p_i$ in the range 1, ..., n indicating a bit location in a binary representation of an n-bit value). Each of the m bits of B has a different respective location.

The second set 804 is the set of all elements V of the first set 800 (i.e. n-bit numbers) for which the n-bit bit-representation of V comprises the m bits of the bit sequence B at their respective predetermined locations within the n-bit bit-representation of V.

Thus, the generation of the verification data at the step 702 may comprise:

Forming an n-bit value B* using:
- the m bits of the bit sequence B at their respective predetermined locations within the n-bit bit-representation of B*.
- n-m bits from the runtime data at the remaining locations within the n-bit bit-representation of B*. Thus, the runtime data will control or select which data element 806 of the second set 804 is represented by the verification data.

The step 704 may comprise providing the verification data to the integrity checker in an encrypted form (with the integrity checker then decrypting the received encrypted verification data prior to carrying out the step 706).

The verification performed at the step 706 may comprise:
Identifying whether the received n-bit verification data D has the m bits of the bit sequence B at the respective predetermined locations within the n-bit bit-representation of D. If the n-bit value D does have the m bits of the bit sequence B at the respective predetermined locations within the n-bit bit-representation of D, then the verification data D is a data element 806 of the second set 804 and the integrity checker may conclude that a modification relating to the verification code 350 has not occurred; otherwise, the verification data D is not a data element 806 of the second set 804 and the integrity checker may conclude that a modification relating to the verification code 350 has occurred.

The integrity checker would then need to know the predetermined bit sequence B, and the predetermined locations for each of the bits of B in order to carry out the step 706.

It will be appreciated that, for example, a modification by an attacker to the predetermined parameters is likely to induce a change in the verification data generated. For an arbitrary amount of verification data D (e.g. verification data D generated after an attack by an attacker), the probability that the n-bit value D comprises the m bits of the bit sequence B at the correct locations is $1/(2^m)$—the value of m can, therefore, be chosen to be large enough so that this probability is less than a predetermined threshold probability $T_1$ (where the smaller the value of $T_1$, the greater security and more reliable the integrity verification). Therefore, it will be appreciated that it is computationally infeasible for an attacker to generate a data element of the second set 804 without knowledge of the predetermined parameters. The number of data elements of the second set 804 is $2^{(n-m)}$—therefore, if n is substantially larger than m, the probability of repeating an amount of verification data D will be very small (assuming that the runtime data is sufficiently random). Indeed, n can be chosen to be large enough so that this probability is less than a predetermined threshold probability $T_2$ (where the smaller the value of $T_2$, the greater security and more reliable the integrity verification).

Example 3

With this example:
Let R be the commutative ring of integers modulo $2^w$ (for some positive integer w which could, for example, be the word size of the computer system 210, such as w=32 or w=64), i.e. $R=Z/(2^w)$.

Let m and n be positive integers, and define L=m+n.

Let the first set 800 be called V. V is the set of all vectors of length L with elements in R (i.e. $V=R^L$). V is an R-module based on the ring R.

Let A be an arbitrary (or randomly chosen/generated) m×m nonsingular (i.e. invertible) matrix A with elements in R. It is well-known how to obtain such an invertible matrix A.

Let c be an arbitrary (or randomly chosen/generated) m×1 vector with elements in R.

Define $$B = \begin{bmatrix} A & 0_{m \times n} \\ 0_{n \times m} & 0_{n \times n} \end{bmatrix},$$

i.e. an L×L matrix with elements in R, where $0_{a \times b}$ represents an a×b matrix with all of its elements equal to 0. Thus, the null space of the matrix B is the set of all elements v in V for which the first m elements of v are 0 and the remaining n elements of v can assume any value in R.

Let C be the vector c with n 0's appended thereto.

Let the second set 804 be called S. Then S is the set of all vectors in V that are a solution to the equation C=Bx (for variable x). A vector U in V is a solution to this equation C=Bx (i.e. so That C=BU) if U is equal to an m×1 vector u of elements in R with n arbitrary elements of R appended thereto, where u is a solution to the equation c=Ax (so that c=Au). Such solutions can be found, for example, since $u=A^{-1}c$.

Thus, the verification code 350 (and/or the data 352 if present) may comprise, or store, a plurality of arbitrary vectors $q_1, \ldots, q_k$ (for some integer k greater than 1) from S. The step 602 may involve generating these vectors $q_1, \ldots, q_k$. As mentioned above, each vector $q_i$ (i=1, ..., k) may be determined by the protection application 222 by: identifying a solution u to the equation c=Ax (so that c=Au) as set out above, and then forming $q_i$ as the vector u with n randomly chosen elements of R appended thereto. Thus, for i=1, ..., k, $Bq_i=C$. The step 602 may, therefore, also involve generating A and c (as set out above)—these may be the same for all instances of the protected item of software 240, or may be individualized for each separate instance of the protected item of software 240.

In some embodiments, the verification code 350 (and/or the data 352 if present) may comprise, or store, a plurality of vectors $z_1, \ldots, z_j$ (for some positive integer j) for which $Bz_j=0$. The step 602 may involve generating these vectors $z_1, \ldots, z_j$. In particular, each vector $z_i$ (i=1, ..., j) may be determined by the protection application 222 as a vector that has its first m elements as 0's and the remaining n element randomly chosen elements of R. Thus, for i=1, ..., j, $Bz_i=0$.

The predetermined parameters then comprise:
the vectors $q_i$ (i=1, ... k) and;
optionally, the vectors $z_i$ (i=1, ..., j).

Then, the generation of the verification data at the step 702 may comprise:

Forming a vector v in V where $v = \Sigma_{i=1}^{k} a_i q_i + \Sigma_{i=1}^{j} b_i z_i$, where the coefficients $a_i$ and $b_i$ are elements of R generated based on the runtime data (e.g. each coefficients $a_i$ and $b_i$ is the value in R represented by w respective bits of the runtime data). The values cf $b_i$ (i=1, ..., j) may all be randomly generated based on the runtime data, or may be generated independently of each other based on the runtime data. The values of $a_i$ ($i=1, \ldots, k$) should satisfy $\Sigma_{i=1}^{k} a_i = 1$. This can be achieved in a number of ways, for example by randomly generating $a_1, \ldots, a_{k-1}$ based on the runtime data (or generating them independently of each other based on the runtime data) and then calculating $a_k$ as $a_k = 1 - \Sigma_{i=1}^{k-1} a_i$. Thus, the verification code 350 may comprise one or more instructions that obtain or generate the coefficients $a_i$ and $b_i$ as set out above, and that generate the vector v as $v = \Sigma_{i=1}^{k} a_i q_i + \Sigma_{i=1}^{j} b_i z_i$. It will be appreciated that the generation of v may be carried out over numerous instructions at various places within the verification code 350 (rather than in one block of code).

Since each $q_i$ ($i=1, \ldots, k$) is an element of S, we have $Bq_i = C$. Additionally, each $z_i$ ($i=1, \ldots, j$) has $Bz_i = 0$. Additionally, as $\Sigma_{i=1}^{k} a_i = 1$, we have $Bv = C$. Thus, the vector v generated in this way is an element of S. As the coefficients $a_i$ and $b_i$ are determined based on the runtime data, the runtime data determines which element of S is generated as the vector v.

As mentioned above, use of the vectors $z_i$ ($i=1, \ldots, j$) is optional, and so they (and the coefficients $b_i$) may be omitted from the above.

The step 704 may comprise providing the verification data to the integrity checker in an encrypted form (with the integrity checker then decrypting the received encrypted verification data prior to carrying out the step 706).

The verification performed at the step 706 may comprise determining whether a received amount of verification data D (that is an element of V) has the property that $BD = C$. If $BD = C$, then the verification data D is an element 806 of the second set 804 and the integrity checker may conclude that a modification relating to the verification code 350 has not occurred; otherwise, the verification data D is not an element 806 of the second set 804 and the integrity checker may conclude that a modification relating to the verification code 350 has occurred.

The integrity checker would then need to know the matrix B and the vector C. It will be appreciated, however, that neither B nor C appear in the verification code 350 (or the data 352 if present), and so are not available to an attacker.

It will be appreciated that, for example, a modification by an attacker to the predetermined parameters is likely to induce a change in the verification data generated. For an arbitrary amount of verification data D (e.g. verification data D generated after an attack by an attacker), the probability that verification data D (as an element of V) is also an element of S is $1/(2^{wm})$—the value of m can, therefore, be chosen to be large enough so that this probability is less than a predetermined threshold probability $T_1$ (where the smaller the value of $T_1$, the greater security and more reliable the integrity verification). Therefore, it will be appreciated that it is computationally infeasible for an attacker to generate an element of the second set 804 without knowledge of the predetermined parameters (or data related to the one or more predetermined parameters, such as D and C). The number of elements of the second set 804 is $2^{nN}$—therefore, by setting the value of n to be sufficiently large, the probability of repeating an amount of verification data D can be made less than a predetermined threshold probability $T_2$ (where the smaller the value of $T_2$, the greater security and more reliable the integrity verification).

It will be appreciated that the columns of B may be re-ordered (with corresponding re-ordering of elements of the other matrices and vectors being performed accordingly).

Example 4

Example 4 is similar to example 3, except that, instead of defining the second set 804 S as the set of all vectors in V that are a solution x to the equation $C = Bx$, the set S is defined as one of:

(a) S is the set of all vectors in V that are a solution x to the equation $XC = XBx$, where X is an arbitrary (or randomly chosen/generated) invertible L×L matrix of elements of R. Thus, S is the set of all vectors in V that are a solution x to the equation $s = Mx$, where $s = XC$ and $M = XB$. Note that:

If q is an element of V such that $Bq = C$, then q is also a solution to the equation $s = Mx$, since $Mq = XBq = XC = s$. As discussed above with reference to example 3, it is possible to find such elements q in V such that $Bq = C$, and so it is also possible to find elements q in V that are elements of S too, i.e. solutions to $s = Mx$.

If z is an element of V such that $Bz = 0$, then $Mz = 0$ too, since $Mz = XBz = X0 = 0$. As discussed above with reference to example 3, it is possible to find such elements z in V such that $Bz = 0$, and so it is also possible to find elements z in V for which $Mz = 0$.

Example 4(a) then operates in the same way as example 3 above, since the vector v formed as $v = \Sigma_{i=1}^{k} a_i q_i + \Sigma_{i=1}^{j} b_i z_i$ has $Mv = s$ and so v is an element of S.

(b) S is the set of all vectors in V that are a solution x to the equation $C = BYx$, where Y is an arbitrary (or randomly chosen/generated) invertible L×L matrix of elements of R. Thus, S is the set of all vectors in V that are a solution x to the equation $s = Mx$, where $s = C$ and $M = BY$. Note that:

If q is an element of V such that $Bq = C$, then $q^* = Y^{-1}q$ is also a solution to the equation $s = Mx$, since $Mq^* = M(Y^{-1}q) = BY(Y^{-1})q = Bq = C = s$. As discussed above with reference to example 3, it is possible to find such elements q in V such that $Bq = C$, and so it is also possible to find elements $q^*$ in V that are elements of S too, i.e. solutions to $s = Mx$.

If z is an element of V such that $Bz = 0$, then $z^* = Y^{-1}z$ has the property that $Mz^* = 0$, since $Mz^* = M(Y^{-1}z) = BY(Y^{-1}z) = Bz = 0$. As discussed above with reference to example 3, it is possible to find such elements z in V such that $Bz = 0$, and so it is also possible to find elements e in V for which $Mz = 0$.

Example 4(b) then operates in the same way as example 3 above, except that instead of using $q_i$ ($i=1, \ldots, k$) and optionally $z_i$ ($i=1, \ldots j$), corresponding elements $q_i^* = Y^{-1} q_i$ ($i=1, \ldots, k$) and optionally corresponding elements $z_i^* = Y^{-1} z_i$ ($i=1, \ldots, j$) are used, since the vector v formed as $v = \Sigma_{i=1}^{k} a_i q_i^* + \Sigma_{i=1}^{j} b_i z_i^*$ has $Mv = s$ and so v is an element of S.

(c) S is the set of all vectors in V that are a solution x to the equation $XC = XBYx$, where X and Y are arbitrary (or randomly chosen/generated) invertible L×L matrices of elements of R. Thus, S is the set of all vectors in V that are a solution x to the equation $s = Mx$, where $s = XC$ and $M = XBY$. Note that:

If q is an element of V such that $Bq = C$, then $q^* = Y^{-1}q$ is also a solution to the equation $s = Mx$, since $Mq^* = M(Y^{-1}q) = XBY(Y^{-1})q = XBq = XC = s$. As discussed above with reference to example 3, it is possible to find such elements q in V such that $Bq = C$, and so it is also possible to find elements $q^*$ in V that are elements of S too, i.e. solutions to $s = Mx$.

If z is an element of V such that Bz=0, then $z^*=Y^{-1}z$ has the property that $Mz^*=0$, since $Mz^*=M(Y^{-1}z)=XBY(Y^{-1}z)=XBz=X0=0$. As discussed above with reference to example 3, it is possible to find such elements z in V such that Bz=0, and so it is also possible to find elements z* in V for which Mz=0.

Example 4(c) then operates in the same way as example 3 above, except that instead of using $q_i$ (i=1, ..., k) and optionally $z_i$ (i=1, ... j), corresponding elements $q_i^*=Y^{-1}q_i$ (i=1, ..., k) and optionally corresponding elements $z_i^*=Y^{-1}z_i$ (i=1, ..., j) are used, since the vector v formed as $v=\Sigma_{i=1}^{k} a_i q_i^* + \Sigma_{i=1}^{j} b_i z_i^*$ has Mv=s and so v is an element of S.

The verification performed at the step 706 may comprise determining whether a received amount of verification data D (that is an element of V) has the property that MD=s. If MD=s, then the verification data D is an element 806 of the second set 804 and the integrity checker may conclude that a modification relating to the verification code 350 has not occurred; otherwise, the verification data D is not an element 806 of the second set 804 and the integrity checker may conclude that a modification relating to the verification code 350 has occurred.

The integrity checker would then need to know the matrix M and the vector s. It will be appreciated, however, that neither M nor s appear in the verification code 350 (or the data 352 if present), and so are not available to an attacker.

Use of the matrix X and/or the matrix Y in the above examples can help improve security. In particular, in example 3, the success space S is the set of all vectors in V that comprise a fixed m×1 vector u of elements in R and n arbitrary elements of R. Use of the matrices X and/or Y helps obscure this. In particular, use of the matrix X redefines the "result space", so that the vectors in the success space S will no longer comprise the fixed m×1 vector u of elements in R and n arbitrary elements of R; use of the matrix Y redefines the "unknown space" (i.e. the space for the unknown x in the equation s=Mx).

4—Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program", "software" or "item of software" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system, potentially with data and/or other resources. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method comprising, during runtime of an item of software that comprises one or more portions of code and verification code:

the verification code generating verification data using (a) runtime data generated by the one or more portions of code and (b) one or more predetermined parameters, the verification data representing an element of a predetermined first set of data elements; and providing the verification data to an integrity checker arranged to (i) identify that a modification relating to the verification code has not occurred when the verification data represents an element of a predetermined second set of data elements, wherein the second set is a subset of the first set, and (ii) identify that a modification relating to the verification code has occurred when the verification data does not represent an element of the second set;

wherein it is computationally infeasible to determine an element of the second set without knowledge of the one or more predetermined parameters or data related to the one or more predetermined parameters; and wherein, in the absence of a modification relating to the verification code, use of the one or more predetermined parameters by the verification code ensures that the verification data represents an element of the second set and use of the runtime data by the verification code controls which element of the second set is represented by the generated verification data.

2. A method of protecting an item of software, wherein the item of software comprises one or more portions of code, the method comprising:

modifying the item of software so that the item of software comprises verification code that is arranged to, during runtime of the item of software, carry out the method of claim claim 1.

3. The method of claim 2, wherein each of the one or more predetermined parameters is part of the verification code or is part of data included into the item of software during said modifying.

4. The method of claim 2, wherein the verification code does not generate the verification data based on software elements present in the item of software prior to said modifying.

5. A method of verifying an item of software, the item of software comprising verification code for generating verification data, the method comprising:
receiving verification data, the verification data representing an element of a predetermined first set of data elements;
when the verification data represents an element of a predetermined second set of data elements, wherein the second set is a subset of the first set, identifying that a modification relating to the verification code has not occurred; and
when the verification data does not represent an element of the second set, identifying that a modification relating to the verification code has occurred; and
wherein it is computationally infeasible to determine an element of the second set without knowledge of one or more predetermined parameters or data related to the one or more predetermined parameters;
wherein, in the absence of a modification relating to the verification code, use of the one or more predetermined parameters by the verification code ensures that the verification data represents an element of the second set and use of runtime data generated by one or more portions of code of the item of software by the verification code controls which element of the second set is represented by the generated verification data.

6. The method of claim 5, comprising:
identifying whether the received verification data corresponds to verification data previously received in relation to the item of software;
when the received verification data does not correspond to verification data previously received in relation to the item of software, identifying that a modification relating to the verification code has not occurred; and
when the received verification data corresponds to verification data previously received in relation to the item of software, identifying that a modification relating to the verification code has occurred.

7. The method of claim 5, wherein the verification code generates the verification data by using the runtime data to generate pseudo-random data and generating the verification data using the pseudo-random data and the one or more predetermined parameters.

8. The method of claim 5, wherein the runtime data is pseudo-random or a source of entropy.

9. The method of claim 5, wherein the verification code is arranged to generate verification data that differs from substantially all verification data previously generated by the verification code.

10. The method of claim 8, wherein the verification code is arranged to generate verification data that differs from substantially all verification data previously generated by the verification code due to the runtime data used to generate the verification data differing from substantially all runtime data previously used by the verification code to generate verification data.

11. The method of claim 1, comprising encrypting or transforming the verification data, wherein providing the verification data to the integrity checker comprises provided the encrypted or transformed verification data to the integrity checker.

12. The method of claim 5, wherein:
the one or more predetermined parameters comprises:
(i) a key;
(ii) a predetermined bit sequence having m bits;
(iii) for each bit of the predetermined bit sequence, a respective location within an n-bit value, where m and n are positive integers with m less than n;
the first set of data elements comprises all possible n-bit values; and
the second set of data elements comprises all possible n-bit values that are an encrypted version, using the key, of an n-bit value B* that comprises the m bits of the predetermined bit sequence at their respective locations within said n-bit value B*.

13. The method of claim 5, wherein:
the one or more predetermined parameters comprises:
(i) a predetermined bit sequence having m bits;
(ii) for each bit of the predetermined bit sequence, a respective location within an n-bit value, where m and n are positive integers with m less than n;
the first set of data elements comprises all possible n-bit values; and
the second set of data elements comprises all possible n-bit values that comprise the m bits of the predetermined bit sequence at their respective locations within the n-bit value.

14. The method of claim 5, wherein:
the one or more predetermined parameters comprises k vectors $q_i(i=1,\ldots,k)$ wherein:
k is a positive integer greater than 1;
for each vector $q_i(i=1,\ldots,k)$, the vector $q_i$ is a vector of length L of elements of a ring R;
there is a predetermined L×L matrix M of elements R and a predetermined vector s of length L of elements of R so that, for each vector $q_i(i=1,\ldots,k)$, $Mq_i=s$;
the first set of data elements comprises all possible vectors of length L of elements of R; and
the second set of data elements comprises all possible vectors x of length L of elements of R for which Mx=s.

15. The method of claim 14, wherein the verification code generates verification data v according to $v=\Sigma_{i=1}^{k}a_iq_i$, wherein $a_i(i=1,\ldots,k)$ are elements of R determined based on the runtime data and $\Sigma_{i=1}^{k}a_i=1$.

16. The method of claim 14, wherein:
the one or more predetermined parameters additionally comprises j vectors $z_i(i=1,\ldots,j)$ wherein:
j is a positive integer;
for each vector $z_i(i=1,\ldots,j)$, the vector $z_i$ is a vector of length L of elements of R and $Mz_i=0$.

17. The method of claim 16, wherein the verification code generates verification data v according to $v=\Sigma_{i=1}^{k}a_iq_i+\Sigma_{i=1}^{j}b_iz_i$, wherein $a_i(i=1,\ldots,k)$ are elements of R determined based on the runtime data, $\Sigma_{i=1}^{k}a_i=1$, and $b_i(i=1,\ldots,j)$ are elements of R determined based on the runtime data.

18. The method of claim 14, wherein:
L=m+n, where m and n are positive integers;
M is based on the matrix $$B = \begin{bmatrix} A & 0_{m \times n} \\ 0_{n \times m} & 0_{n \times n} \end{bmatrix},$$

where A is an invertible m×m matrix of elements in R and where $O_{a \times b}$ represents an a×b matrix with all of its elements equal to 0;
s is based on a vector comprising an m×1 vector c of elements in R and n 0's.

19. The method of claim 18, wherein either:
(i) M=B; s is the vector c with the n 0's appended thereto; and for each vector $q_i$ (i=1, . . . ,k), the vector $q_i$ is a vector comprising a vector u and n elements of R appended thereto, where $u=A^{-1}c$;
(ii) M=XB, where X is an invertible L×L matrix of elements in R; s is the vector XC, where C is the vector c with the n 0's appended thereto; and for each vector $q_i$(i=1, . . . ,k), the vector $q_i$ is a vector comprising a vector u and n elements of R appended thereto, where $u=A^{-1}c$;
(iii) M=BY, where Y is an invertible L×L matrix of elements in R; s is the vector c with the n 0's appended thereto; and for each vector $q_i$(i=1, . . . ,k), the vector $q_i$ is a vector comprising the vector $Y^{-1}U$, where U is a vector u with n elements of R appended thereto, where $u=A^{-1}c$;
(iv) M=XBY, where X and Y are an invertible L×L matrices of elements in R; s is the vector XC, where C is the vector c with the n 0's appended thereto; and for each vector $q_i$ (i=1, . . . ,k), the vector $q_i$ is a vector comprising the vector $Y^{-1}U$, where U is a vector u with n elements of R appended thereto, where $u=A^{-1}c$.

20. The method of claim 5, wherein the verification code is interleaved with other code of the item of software.

21. The method of claim 5, wherein one or more white-box protection techniques are applied to at least the verification code to thereby protect the verification code.

22. The method of claim 1, wherein the verification code generates the verification data by using the runtime data to generate pseudo-random data and generating the verification data using the pseudo-random data and the one or more predetermined parameters.

23. The method of claim 1, wherein the runtime data is pseudo-random or a source of entropy.

24. The method of claim 1, wherein the verification code is arranged to generate verification data that differs from substantially all verification data previously generated by the verification code.

25. The method of claim 2, wherein the verification code is arranged to generate verification data that differs from substantially all verification data previously generated by the verification code due to the runtime data used to generate the verification data differing from substantially all runtime data previously used by the verification code to generate verification data.

26. The method of claim 1, wherein:
the one or more predetermined parameters comprises:
(i) a key;
(ii) a predetermined bit sequence having m bits;
(iii) for each bit of the predetermined bit sequence, a respective location within an n-bit value, where m and n are positive integers with m less than n;
the first set of data elements comprises all possible n-bit values; and
the second set of data elements comprises all possible n-bit values that are an encrypted version, using the key, of an n-bit value B* that comprises the m bits of the predetermined bit sequence at their respective locations within said n-bit value B*.

27. The method of claim 1, wherein:
the one or more predetermined parameters comprises:
(i) a predetermined bit sequence having m bits;
(ii) for each bit of the predetermined bit sequence, a respective location within an n-bit value, where m and n are positive integers with m less than n;
the first set of data elements comprises all possible n-bit values; and
the second set of data elements comprises all possible n-bit values that comprise the m bits of the predetermined bit sequence at their respective locations within the n-bit value.

28. The method of claim 1, wherein:
the one or more predetermined parameters comprises k vectors $q_i$(i=1, . . . ,k) wherein:
k is a positive integer greater than 1;
for each vector $q_i$(i=1, . . . ,k), the vector $q_i$ is a vector of length L of elements of a ring R;
there is a predetermined L×L matrix M of elements R and a predetermined vector s of length L of elements of R so that, for each vector $q_i$(i=1, . . . ,k), $Mq_i=s$;
the first set of data elements comprises all possible vectors of length L of elements of R; and
the second set of data elements comprises all possible vectors x of length L of elements of R for which Mx=s.

29. The method of claim 28, wherein the verification code generates verification data v according to $v=\Sigma_{i=1}^{k}a_iq_i$, wherein $a_i$(i=1, . . . ,k) are elements of R determined based on the runtime data and $\Sigma_{i=1}^{k}a_i=1$.

30. The method of claim 28, wherein:
the one or more predetermined parameters additionally comprises j vectors $z_i$(i=1, . . . ,j) wherein:
j is a positive integer;
for each vector $z_i$(i=1, . . . ,j), the vector $z_i$ is a vector of length L of elements of R and $Mz_i=0$.

31. The method of claim 30, wherein the verification code generates verification data v according to $v=\Sigma_{i=1}^{k}a_iq_i+\Sigma_{i=1}^{j}b_iz_i$, wherein $a_i$(i=1, . . . ,k) are elements of R determined based on the runtime data, $\Sigma_{i=1}^{k}a_i=1$, and $b_i$(i=1, . . . ,j) are elements of R determined based on the runtime data.

32. The method of claim 28, wherein:
L=m+n, where m and n are positive integers;
M is based on the matrix $$B = \begin{bmatrix} A & 0_{m \times n} \\ 0_{n \times m} & 0_{n \times n} \end{bmatrix},$$

where A is an invertible m×m matrix of elements in R and where $O_{a \times b}$ represents an a×b matrix with all of its elements equal to 0;
s is based on a vector comprising an m×1 vector c of elements in R and n 0's.

33. The method of claim 11, wherein either:
(i) M=B; s is the vector c with the n 0's appended thereto; and for each vector $q_i$ (i=1, . . . ,k), the vector $q_i$ is a vector comprising a vector u and n elements of R appended thereto, where $u=A^{-1}c$;

(ii) M=XB, where X is an invertible L×L matrix of elements in R; s is the vector XC, where C is the vector c with the n 0's appended thereto; and for each vector $q_i$ (i=1, ... ,k), the vector $q_i$ is a vector comprising a vector u and n elements of R appended thereto, where $u=A^{-1}c$;

(iii) M=BY, where Y is an invertible L×L matrix of elements in R; s is the vector c with the n 0's appended thereto; and for each vector $q_i$(i=1, ... ,k), the vector $q_i$ is a vector comprising the vector $Y^{-1}U$, where U is a vector u with n elements of R appended thereto, where $u=A^{-1}c$;

(iv) M=XBY, where X and Y are an invertible L×L matrices of elements in R; s is the vector XC, where C is the vector c with the n 0's appended thereto; and for each vector $q_i$ (i=1, ... ,k), the vector $q_i$ is a vector comprising the vector $Y^{-1}U$, where U is a vector u with n elements of R appended thereto, where $u=A^{-1}c$.

34. The method of claim 1, wherein the verification code is interleaved with other code of the item of software.

35. The method of claim 1, wherein one or more white-box protection techniques are applied to at least the verification code to thereby protect the verification code.

36. An apparatus comprising:
one or more computer hardware processors, the one or more computer hardware processors arranged to execute an item of software that comprises one or more portions of code and verification code, wherein execution of the item of software by the one or more processors computer hardware processors comprises:
the verification code generating verification data using (a) runtime data generated by the one or more portions of code and (b) one or more predetermined parameters, the verification data representing an element of a predetermined first set of data elements; and
providing the verification data to an integrity checker arranged to (i) identify that a modification relating to the verification code has not occurred when the verification data represents an element of a predetermined second set of data elements, wherein the second set is a subset of the first set, and (ii) identify that a modification relating to the verification code has occurred when the verification data does not represent an element of the second set;
wherein it is computationally infeasible to determine an element of the second set without knowledge of the one or more predetermined parameters or data related to the one or more predetermined parameters; and
wherein, in the absence of a modification relating to the verification code, use of the one or more predetermined parameters by the verification code ensures that the verification data represents an element of the second set and use of the runtime data by the verification code controls which element of the second set is represented by the generated verification data.

37. An apparatus comprising:
one or more computer hardware processors, the one or more computer hardware processors arranged to protect an item of software, wherein the item of software comprises one or more portions of code, wherein the one or more computer hardware processors are arranged to:
modify the item of software so that the item of software comprises verification code that is arranged to, during runtime of the item of software:
generate verification data using (a) runtime data generated by the one or more portions of code and (b) one or more predetermined parameters, the verification data representing an element of a predetermined first set of data elements; and
provide the verification data to an integrity checker arranged to (i) identify that a modification relating to the verification code has not occurred when the verification data represents an element of a predetermined second set of data elements, wherein the second set is a subset of the first set, and (ii) identify that a modification relating to the verification code has occurred when the verification data does not represent an element of the second set;
wherein it is computationally infeasible to determine an element of the second set without knowledge of the one or more predetermined parameters or data related to the one or more predetermined parameters; and
wherein, in the absence of a modification relating to the verification code, use of the one or more predetermined parameters by the verification code ensures that the verification data represents an element of the second set and use of the runtime data by the verification code controls which element of the second set is represented by the generated verification data.

38. An apparatus comprising:
one or more computer hardware processors, the one or more computer hardware processors arranged to verify an item of software, the item of software comprising verification code for generating verification data, wherein the one or more computer hardware processors are arranged to:
receive verification data, the verification data representing an element of a predetermined first set of data elements;
when the verification data represents an element of a predetermined second set of data elements, wherein the second set is a subset of the first set, identify that a modification relating to the verification code has not occurred; and
when the verification data does not represent an element of the second set, identify that a modification relating to the verification code has occurred; and
wherein it is computationally infeasible to determine an element of the second set without knowledge of one or more predetermined parameters or data related to the one or more predetermined parameters;
wherein, in the absence of a modification relating to the verification code, use of the one or more predetermined parameters by the verification code ensures that the verification data represents an element of the second set and use of runtime data generated by one or more portions of code of the item of software by the verification code controls which element of the second set is represented by the generated verification data.

* * * * *